(12) United States Patent
Kunz et al.

(10) Patent No.: US 10,501,606 B2
(45) Date of Patent: Dec. 10, 2019

(54) MODIFIED CELLULOSE FIBERS AND PREPARATION METHOD

(71) Applicant: Technische Universität Berlin, Berlin (DE)

(72) Inventors: Thomas Kunz, Berlin (DE); Niklas Ole Brandt, Berlin (DE); Frank-Jürgen Methner, Bitburg (DE)

(73) Assignee: Technische Universität Berlin, Berlin (DE)

( * ) Notice: Subject to any disclaimer, the term of this patent is extended or adjusted under 35 U.S.C. 154(b) by 0 days.

(21) Appl. No.: 16/060,437

(22) PCT Filed: Dec. 7, 2016

(86) PCT No.: PCT/EP2016/080155
§ 371 (c)(1),
(2) Date: Jun. 8, 2018

(87) PCT Pub. No.: WO2017/097864
PCT Pub. Date: Jun. 15, 2017

(65) Prior Publication Data
US 2019/0002669 A1 Jan. 3, 2019

(30) Foreign Application Priority Data

Dec. 8, 2015 (DE) .................. 10 2015 121 383

(51) Int. Cl.
*C08L 1/02* (2006.01)
*B01D 39/18* (2006.01)
(Continued)

(52) U.S. Cl.
CPC .............. *C08L 1/02* (2013.01); *B01D 39/18* (2013.01); *C08K 3/36* (2013.01); *B01D 2239/10* (2013.01);
(Continued)

(58) Field of Classification Search
CPC .... C08L 1/02; C08L 3/02; C08L 39/04; C08L 2203/12; C08L 2205/16; B01D 39/18; B01D 2239/10; C08K 3/36
See application file for complete search history.

(56) References Cited

U.S. PATENT DOCUMENTS

2014/0322386 A1* 10/2014 Farley .................... C12C 11/11
426/8
2014/0370180 A1* 12/2014 Tan ...................... A23C 9/1544
426/580
(Continued)

FOREIGN PATENT DOCUMENTS

CN 101445609 A * 6/2009
CN 104312809 A 1/2015
(Continued)

OTHER PUBLICATIONS

English-language machine translation of CN 101445609A (2009).*
(Continued)

*Primary Examiner* — Nicholas E Hill
(74) *Attorney, Agent, or Firm* — Sonia K. Guterman; Preeti T. Arun; Armis Intellectual Property Law, LLC

(57) ABSTRACT

The invention relates to a method for the preparation of modified cellulose fibers for artificial clarification of active haze substances from liquids. In addition, the invention relates to a modified cellulose fiber obtained by the method according to the invention for artificial clarification of active haze substances from a liquid, and to auxiliary filtering means containing one or more of the modified cellulose fibers.

13 Claims, 16 Drawing Sheets

(51) Int. Cl.
*C08K 3/36* (2006.01)
*C08L 3/02* (2006.01)
*C08L 39/04* (2006.01)

(52) U.S. Cl.
CPC .............. *C08L 3/02* (2013.01); *C08L 39/04* (2013.01); *C08L 2203/12* (2013.01); *C08L 2205/16* (2013.01)

(56) References Cited

U.S. PATENT DOCUMENTS

2015/0354095 A1* 12/2015 Bernt ............... D01D 5/247 604/372
2016/0220932 A1* 8/2016 Probst ............... B01D 37/02

FOREIGN PATENT DOCUMENTS

| DE | 4110252 | C1 | 2/1992 | |
|----|---------|----|--------|---|
| DE | 69124983 | T2 | 10/1997 | |
| DE | 102004962617 | A1 | 7/2006 | |
| EP | 1333906 | A1 | 8/2003 | |
| EP | 2280098 | A1 | 2/2011 | |
| JP | 55111842 | A | 8/1980 | |
| JP | 5840145 | A | 3/1983 | |
| WO | WO-2011012424 | A1 * | 2/2011 | ............ D01D 5/247 |
| WO | 2015036372 | A1 | 3/2015 | |
| WO | 2015110694 | A1 | 7/2015 | |

OTHER PUBLICATIONS

Chunyu Chang, et al., "Superabsorbent Hydrogels Based on Cellulose for Smart Swelling and Controllable Delivery," 46 European Polymer Journal 92-100 (2010).*
Braun, F. et al., "Large-Scale Study on Beer Filtration with Combined Filter Aid Additions to Cellulose Fibers", Journal of the Institute of Brewing, publication No. G-2011-0921-1107, 2011, p. 314-328.
International Search Report and Written Opinion of the International Searching Authority received in PCT/EP2016/080155, dated Mar. 8, 2017 (11 pgs.).
International Search Report received in PCT/EP2016/080155, dated Mar. 8, 2017(4 pgs.).
International Preliminary Report on Patentability received in PCT/EP2016/080155, dated Jun. 14, 2018 (12 pgs.).

* cited by examiner

MODIFIED CELLULOSE FIBERS AND PREPARATION METHOD

RELATED APPLICATIONS

This application is a national phase application and claims the benefit of international application serial number PCT/EP2015/080155 filed Dec. 7, 2016 which claims the benefit of German application serial number 10 2015 121 383.4 filed Dec. 8, 2015, both of which are hereby incorporated herein by reference in their entireties.

The invention relates to a method for producing modified cellulose fibers for use in methods for artificial clarification of turbidity-causing substances from liquids. Furthermore the invention relates to the use of the modified cellulose fibers as a filter aid for artificial clarification of turbidity-causing substances from liquids.

The most important quality features of clear beverages such as beer, wine, juices and other liquids, besides the taste, odor and color, also include the physicochemical stability and the clarity. To obtain sparkling clear beers and wines or juices, they must be filtered.

In particular in the production of beer, a quantity of turbidity substances such as yeast cells, hops resins or protein-tannin compounds are still in suspension after aging is concluded. These substances give the beer a milky and cloudy appearance. In addition such turbidity-causing substances can also have a negative influence on the taste and aroma of the beer.

Filtration, also known as artificial clarification, is therefore the last step a beer must pass through after aging and before bottling. Aging (natural clarification) already improves the colloidal stability of beer through sedimentation of turbidity-causing substances. In addition the stability of beer can be improved by using stabilizers and an additional filtration (artificial clarification). The most important reasons for requiring filtration include:

Removing turbidity substances such as yeast cells, hops resins or protein tannin compounds;
Additional reduction of substances such as proteins or tannins that can form renewed turbidity in filtered beer;
Removing microorganisms such as yeasts or bacteria;
Clear appearance;
Sensorial improvement.

Various filtration methods are known for obtaining a clear and microbe-free beer. One popular method is to use deadend filtration with diatomaceous earth or other filter aids, such as perlite, cellulose and Crosspure®. It is also customary to use sheet filters in the form of prepared filter layers (sheets) and/or to use the filter aids listed. To an increasing extent, membrane filtration (cross-flow filtration) is also being used in breweries in combination with preclarification by separators, for example.

High-quality beer can be produced with any of these systems. These types of filtration, such as deadend filtration, sheet filtration and membrane filtration (cross-flow filtration), which are known in the state of the art, have various disadvantages.

The main thing to be taken into account in deadend filtration is the use of filter aids such as diatomaceous earth, to which there are some health objections, plus the necessity of disposal, as well as the undesirable input of pro-oxidative metal ions, such as iron, into the beverage matrix, can be considered as a substantial disadvantage in comparison with membrane filtration. In addition, membrane filtration methods are very inflexible with regard to the available variety of methods and the associated differences in quality of the filtrate. In deadend filtration, the filtration performance of the membrane is automatically reduced in the case of liquids that are more difficult to filter, by adapting the particle size of the diatomaceous earth mixture to the varying quality of the unfiltered beer. For this reason, several modules are always operated in parallel in membrane filter systems, so that, although a continuous process is possible, it is also associated with a much higher investment cost. Both operating costs and installation costs are therefore much higher in membrane filtration in comparison with deadend filtration; likewise, power consumption and water consumption are also higher.

Another important disadvantage, which occurs due to the use of diatomaceous earth, is the unwanted input of heavy metal ions, in particular the input of pro-oxidative iron or copper. In addition to the input of iron due to the raw materials (malt, hops, brewing water, yeast), iron is introduced into beer mainly from the iron released from the diatomaceous earth precoating, and second, from the iron released from the continuous diatomaceous earth dosage. A large portion of the iron is deposited in the first 15 minutes in deadend filtration at the start of filtration and then declines continuously. However, continuous dosing of diatomaceous earth continues to lead to a uniformly high input of iron into the beer. The total amount of beer-soluble iron and/or the total amount of copper, although to a lesser extent, depend(s) on the variety of diatomaceous earth. The recommended limit value is 0.20 mg/L. However, the latest research findings indicate that much lower values of <0.05 mg/L are desirable for beer and should be established as goals because of the strong influence of the metal ions on the oxidative and colloidal stability of beer.

In the meantime, diatomaceous earth has also been included in the MAC list (maximum allowed job site levels) and the BAK list by the "German Research Society (DFG) for Testing Occupational Substances Hazardous to Health" and should be classified in category 1 "Carcinogenic in humans." Furthermore, disposal of used diatomaceous earth must also be classified as "special wastes, monitoring required" and thus makes disposal both complex and cost-intensive.

Furthermore, attempts to regenerate spent diatomaceous earth that has become useless as a filter aid have met with only limited success in practice. Some breweries have switched to the use of membrane filtration because of the uncertain situation with regard to additional, more stringent statutory regulations in handling and disposal of diatomaceous earth as well as advances in technical developments in recent years in the field of membrane filtration.

From the aforementioned aspects, the ideal beer filtration would be deadend filtration without the use of diatomaceous earth, so that it will be possible to continue using the existing deadend filtration installations and/or sheet filtration installations in breweries.

For these reasons, there is an urgent demand for filter aids that are free of diatomaceous earth.

European Patent EP 1 333 906 B1 describes in this regard Crosspure®, an alternative regenerable filter aid. This filter aid consists of 70% polystyrene, which has already been approved for food production and is already widespread today. Other ingredients include crosslinked polyvinyl pyrrolidone (PVP) or polyvinyl polypyrrolidone (PVPP). With these filter aids, particulate turbidity-causing substances can be removed by a physical method, and dissolved turbidity-causing polyphenols can be bound.

However, has been found that the regenerable Crosspure® filter aid has a crucial disadvantage because it is prepared from a mixture of coarse and fine filter aids. After use and subsequent regeneration, there is also an undefined mixture of coarse and fine filter aid particles. According to the current state of the art, this mixture is still unsuitable for practice, i.e., it cannot be separated in a sufficiently economical manner. Accordingly, there is no longer adequate precision in the adaptability of the respective filter aid required in various unfiltered beers and/or filtration method steps, such as, for example, precoating. The increased expenses to achieve a sufficient precision once again results in higher filtration costs than those with comparable methods.

In addition there have been preliminary attempts, e.g., by F. Braun, H. Evers, etc. (Frank Braun et al., "Large-Scale Study on Beer Filtration with Combined Filter Aid Additions to Cellulose Fibers", Journal of the Institute of Brewing, publication no. G-2011-0921-1107, 2011) to use untreated cellulose fibers and silica sol for filtration of beer. In these methods, a second filtration step is also carried out using a trap filter. However, this method does not achieve the turbidity values of those in diatomaceous earth filtration (0.8/0.2 EBC (90°/25°)), which can be used as comparative values for high-quality beer filtration.

The EBC unit—which is still used below—here stands for European Brewing Convention, which promotes the scientific activity of brewing in Europe. EBC units are used to describe, among other things, the turbidity of beer, the color of beer and the bitter value of a beer.

The turbidity values which are determined by this method and expressed in EBC units are determined in accordance with the MEBAK—Brewing industry analytical methods for beer wort, mixed beer beverages, a compilation of methods of the Central European Brewing Industry Analytical Commission, self publication of MEBAK, D-85358 Freising-Weihenstephan, 2012, ISBN 978-3-9805814-6-2, pages 193-194, point 2.14.1.2.

In the method described by Braun, a horizontal pilot filter is used for precoating of horizontal layers, and a trap filter with 10 μm columns is used as a secondary filter in a second filtration step. Due to these two filtration steps, the method according to Braun is also very complex and therefore cost intensive.

Another disadvantage of the method according to Braun is the disposal of the cellulose fibers when used in mixture with PVPP or silica sol and/or silica gel. Thus, the same problems occur here as when using diatomaceous earth.

Therefore, the object of the present invention is to make available alternative filter aids for artificial clarification of turbidity-causing substances from liquids. In addition, the object of the invention is to provide materials for filter aids, which overcome the aforementioned disadvantages of the state of the art.

The present invention therefore provides an alternative filter aid for replacing diatomaceous earth, which conforms to the qualitative and economic requirements of brewing science while also permitting additional benefits in use.

The alternative filter aid is made possible by the method according to the invention for producing modified cellulose fibers, wherein the modified fibers eliminate the disadvantages of the state of the art when used as filter aids in the method for artificial clarification of turbidity-causing substances from liquids. This method for producing modified fibers and the modified fibers themselves are thus the subject matter of the independent claims. Preferred embodiments are the subject matter of the dependent claims.

Therefore, one subject matter of the present invention is a method for producing modified cellulose fibers, comprising one or more of the following steps:
I. Preparation steps
a) Weighing in a fiber mixture consisting of
  80-99.9 wt % cellulose fibers,
  0.1-10 wt % sodium croscarmellose and
  0-10 wt % of one or more additives;
II. Swelling and preparation steps in a neutral to alkaline range
b) Topping off the initial weight of mixture with a polar solvent;
c) Adjusting the pH;
III. Heating steps
d) Heating the initial weight of mixture to the boiling point while stirring;
e) Cooking the initial weight of substance while stirring;
f) Cooling the initial weight of mixture while stirring;
IV. Washing steps
g) Separating the polar solvent;
h) Washing the fibers;
V. Homogenization steps
i) Loosening and/or pulverizing by stirring the moist mass;
VI. Fabrication steps (optionally applicable)
j) Drying the moist mass;
k) Isolating and optionally process the modified cellulose fibers.

The subject matter of the invention is optionally also the modified cellulose fibers obtained by the method according to the invention, which can be used as filter aids for artificial clarification of turbidity-causing substances out of a liquid, consisting of:
a) 80-99.9 wt % of a main function substance based on cellulose fibers;
b) 0.1-10 wt % of an auxiliary function substance based on carboxymethylcelluloses and
c) 0-10 wt % of one or more additives.

In addition, the subject matter of the invention is also a filtration aid containing one or more cellulose fibers modified according to the invention.

In a first method step (a), a fiber mixture consisting of 80-99.9 wt % cellulose fibers, 0.1-10 wt % sodium croscarmellose and 0-10 wt % of one or more additives is weighed in for the method according to the invention.

In particular, fiber mixtures containing, first, cellulose fibers in the amount of 80-85 wt %, 82-90 wt %, 85-92 wt %, 87-95 wt %, 90-99 wt %, 92-99.0 wt %, 90-99.9 wt %, and, second, containing an amount of sodium croscarmellose and additional additives are used and are provided in balancing weight ratios for the method according to the invention.

The amount of sodium croscarmellose is typically between 0.1 and 3 wt %, 0.1 and 0.5 wt %, 0.2 and 1 wt %, 0.5 and 1.5 wt %, 1 and 3 wt %, 0.8 and 2.5 wt %, 1.2 and 3.5 wt %, 1.5 and 3.8 wt %, 1.8 and 4 wt %; 2 and 4.5 wt %, 2.2 and 4.8 wt %, 2.5 and 6 wt %, 2.5 and 8 wt %, 3.0 and 8 wt %, 3.0 and 6 wt %, 3.2 and 7 wt %, 3.5 and 9 wt %, 2.5 and 9 wt %, 4.0 and 10 wt %, 4.5 and 10 wt %. For topping off to 100 wt %, usually one or more additives are provided as described below.

The total of the ingredients contained in the fiber mixture amounts to 100 wt % and is comprises of the cellulose fibers, sodium croscarmellose and/or one or more additives.

The fiber mixture consists of various cellulose fibers of different lengths and properties. Cellulose fibers are understood to be the group of fibers including cellulose, cellulose-based fibers, fibers from grains, from wood, from bamboo, from wood chips, from wood wastes or mixtures of same. A greater crosslinking between the individual fibers is achieved due to the inventive and targeted processing of the cellulose fibers with carboxymethylcelluloses and/or in particular with sodium croscarmellose, and/or finer branching is achieved by incorporation of additional compounds. This is achieved due to the mechanical bonding of the fibers to one another, on the one hand, and also, on the other hand, due to the improved chemical binding properties of the modified cellulose fibers.

The processing of the cellulose fibers according to the invention imparts to them an additional functionality, which is recognizable by the improved binding capacity of specific proteins, so that even turbid-causing proteins and/or protein-polyphenol compounds can be removed. Subsequently, little to no stabilizer such as silica gel or diatomaceous earth is needed and the inventive use of the modified fibers as filter aids is less expensive.

Carboxymethylcelluloses (CMC) are cellulose ethers, i.e., derivatives of cellulose in which some of the hydroxy groups are linked as ethers to a carboxymethyl group ($-CH_2-COOH$). For production, the celluloses obtained from coniferous and deciduous woods or cellulose are ground and converted to the more reactive alkali cellulose with sodium hydroxide solution. Alkylation of the alkali cellulose to carboxymethylcellulose is carried out in chloroacetic acid. The cellulose structure is retained and the acid form is insoluble in water. However, carboxymethyl celluloses are readily soluble in basic solutions.

In the EU, carboxymethylcellulose is approved as a food additive with the number E 466. In this regard, disposal of the filter aid according to the invention consisting of the modified cellulose fibers containing CMC is less cost-intensive and instead this filter aid can be composted in the simplest possible manner. Furthermore, approval as an animal feed or feed additive is also possible. Sodium croscarmellose is a water-insoluble variant of carboxymethylcellulose produced by crosslinking.

It is known in general that sodium croscarmellose is a swellable water-insoluble polysugar that is used as an additive in pharmaceutical production and in food technology. Crosslinking of the carboxymethyl cellulose polymer chains takes place by means of glycolic acid which is formed there from excess chloroacetic acid from the previous method step in carboxymethylcellulose. Deprotonation of the carboxyl groups by the acid that is formed then makes it possible for bonds to other polymer chains to be formed. The degree of crosslinking can be controlled through the pH and the temperature. No crosslinking agents are used there. Due to the crosslinking of the polymer chains, sodium croscarmellose is practically insoluble in water, but it has a high water-binding capacity and swells to four to eight times its original volume by absorbing water. The swelling of the fibers and the enlarged volume as a result advantageously yield an improved uptake behavior (filtration behavior) for turbidity substances. Sodium croscarmellose is virtually insoluble in acetone, ethanol, toluene and diethyl ether. In addition, it is interesting that sodium croscarmellose is not absorbed by the human body.

Additives for use in the method according to the invention include excipients and/or additives, which can be added to the fiber mixture to achieve a positive effect on the production and/or storage and/or processing and/or properties of the modified cellulose fibers during or after filtration. The additives that are used meet the requirements of good environmental compatibility, low health risk, high economy and high stability. Preferred additives for the method according to the invention include, for example, one or more of the additives selected from the group of additives consisting of pectin, carrageenan, isinglass, hydrocolloids, starch, gallotannins, silica sol, silica gel, polyvinylpyrrolidone, polyvinylpolypyrrolidone (PVPP), which may be added alone or in mixtures. These additives improve the technical usability and further increase the filter performance of the modified cellulose fibers.

In method step (b) of the method according to the invention, the initial weight of the mixture from method step (a) is topped off with a polar solvent. Examples of polar solvents include solvents from the group of solvents containing water, alcohol, aqueous solutions with carboxylic acids, amines or mixtures of same.

In method step (c), the pH is adjusted for processing the cellulose fibers. In workup of the fibers, the adjustment of pH is a step that alters the reaction process. The method according to the invention is preferably carried out in an alkaline or weakly alkaline to neutral pH range or even in a weakly acidic range. It has been demonstrated that the method according to the invention can be carried out in a pH range from pH 6 to pH 13.

Depending on the starting materials used, it is advantageous to adjust the pH and to ascertain the pH at which unwanted constituents such as metal ions are washed out. Since other ingredients are to be expected for different starting materials, it is possible according to the present invention to adjust the pH with one or more acids or bases. Those skilled in the art usually use HCl or NaOH for this purpose.

In experiments at various pH levels, it has been found that a significant increase in the iron level in the polar solvent can be measured by adjusting the pH in the alkaline range at pH≥9 and by using a few starting materials. This iron level is partially washed out as iron oxide that is formed in workup of the fibers and can thus no longer enter the beer subsequently during the filtration process (Table 1).

TABLE 1

| Iron measurement in section filtered workup solution | | | | |
|---|---|---|---|---|
| Fiber | Croscarmellose sodium % | pH in workup — | Iron ppb | Standard deviation ppb |
| Cellulose fiber A | 2 | — | 125 | 2.2 |
| Cellulose fiber A | 2.5 | — | 207 | 0.0 |
| Cellulose fiber A | 3 | 9 | 442 | 5.7 |

It should thus be emphasized in particular that carrying out the method in the alkaline range brings additional advantages for application of the modified fibers according to the invention in filtration.

Workup is carried out while stirring in method steps (d) through (f). The stirring may be performed by a magnetic stirrer, for example, but this does not preclude the use of other methods for stirring the initial weight of the mixture, nor is it limited to these methods.

The initial weight of the mixture is cooked while stirring in method steps (d) and (e). The cooking operation may take up to 360 minutes. The cooking process may also last longer than 360 minutes, depending on the fiber used and/or previous and/or subsequent processes.

Modified cellulose fibers that lead to a reduction in turbidity in the filtration process and to a reduction in the turbidity value from 45 EBC to 19 EBC can be obtained even after a 60-minute cooking process. Therefore, workup of the cellulose fibers leads to a significant improvement in turbidity values in the downstream filtration processes.

Cooking is preferably maintained at a cooking temperature in the range between 60° C. and 105° C., alternatively, 60° C. to 80° C., 70° C. to 90° C., 80° C. to 105° C. Cooking may also take place under pressure, so that cooking temperatures above the boiling point of the respective polar solvent can be achieved. Cooking at a slight excess pressure is provided in industrial production.

In method step (f), the fiber mixture is cooled while stirring.

In method step (g) the polar solvent is separated from the initial rate of the mixture by suction filtration by means of a vacuum pump through filter paper, for example. Separation of the polar solvent is not limited to the vacuum pump here. Additional methods known in the prior art can also be used here for suction filtration and/or separation.

In method step (h), for example, the initial weight of mixture is washed with double-distilled water, tap water, slightly alkaline or slightly acidic solution, saline solution (e.g., NaCl solution) by renewed suction filtration and/or separation using a vacuum pump.

In method step (i), the moist mass is loosened by stirring, pulverized and/or homogenized. Other loosening, pulverizing or homogenizing methods with which those skilled in the art are familiar may also be used.

In optional method step (j), the moist mass is dried to a residual water content of approx. 2% to 10%. The modified cellulose fibers are made more stable and transportable by this drying and can be used in an automatic application for filtration after this processing step. However, the modified cellulose fiber can also be used directly in the filtration method, e.g., for deadend filtration even without method step (j) using the present moist mass. For example, drying is advantageous if the modified cellulose fiber is then pressed to form sheets for use in a sheet filter, for example.

In method step (k) the modified fiber is isolated. Isolation may also be understood to mean that the modified cellulose fiber is converted from the modification process only in the filtration process.

The method steps (b) and (d)-(k) can of course be combined, exchanged, replaced and modified freely within the scope of the known prior art.

The term "modified cellulose fiber" is understood to refer to a thermal and/or mechanical and/or chemical action and/or cellulose fibers with which the filtration properties are improved that have been modified in a targeted manner by additives.

For example the iron content in the fibers can be reduced significantly through the inventive workup of the cellulose fibers and therefore the filtration related iron input which has an oxidative action is reduced significantly in comparison with the use of diatomaceous earth as a filter aid. Subsequently a greater oxidative stability of beer can be achieved. In addition the cellulose fiber that has been worked up according to the invention allows an additional binding of turbidity-causing proteins and/or protein polyphenol compounds and a greater colloidal stability of beer can be achieved through this additive effect in comparison with filtration using diatomaceous earth or crude cellulose fibers.

Therefore the addition of the stabilizers that are generally used such as PVPP or silica sol or silica gel can be reduced while achieving the same colloidal stability so that the filtration can be carried out less expensively.

The cellulose fibers are selected from the group of fibers consisting of cellulose, cellulose-based fibers, fibers made of grains, wood, bamboo, wood chips, wood wastes or mixtures of same. These fibers have an average fiber length in the range of <1 to 500 μm. The phrase "fibers with an average length" is understood to refer to the production-related scattering and the phrase "combined use of fibers with different lengths" is understood to refer to an average range of 1-500 μm. The fibers may have different fiber lengths (long fibers, short fibers), because the dead head behavior is influenced to a great extent on the average fiber length and the specific gravity or fineness of the cellulose fibers. The use of cellulose fibers to produce modified cellulose fibers yields additional advantages for the use of these fibers for a filter aid:

Despite the high cost of acquisition of cellulose fibers in comparison with diatomaceous earth filtration, the profitability aspect is improved.

Lower operating costs can be implemented due to the lower mass demand with the same filtration capacity.

The cellulose that is used as the starting material for production of fibers for filtration is a renewable raw material. The diatomaceous earth that can be mined above ground originates from the crushed fossilized shells of silaceous algae (diatoms) approximately 15 million years ago, and therefore the quantity is limited. In this regard, a price increase is highly likely in the future because of the shortage of this resource and therefore access to renewable raw materials must be considered to be highly advantageous.

As already mentioned above, diatomaceous earth has already been included in the MAC and BAK lists because of the problem of dust production and is classified in category 1 "Carcinogenic in humans."

For filtration of beer, there has been an increased search for suitable alternatives to diatomaceous earth filtration in this regard. Filtration using a filter aid based on cellulose fibers is a process which suppresses excessive dust production.

In comparison with filtration with diatomaceous earth, no iron ions or at least definitely fewer iron ions are introduced into beer when using a filter aid according to the invention. Therefore, fewer radicals are formed, so that the endogenous antioxidative potential of the beer is reduced to a much lesser extent and therefore its oxidative stability is improved. Subsequently, the result is a more stable taste and furthermore the colloidal stability is prolonged.

In the prior art, beer is treated with stabilizers such as PVPP or silica gel to improve the physical stability of the beer. This removes the turbidity-causing polyphenols (PVPP) polyvinyl polypyrrolidone or proteins (silica gel), i.e., polyphenol-protein compounds during the brewing process to obtain a greater turbidity stability in ready-to-sell beers. This step typically takes place in both deadend filtration as well as membrane filtration.

Due to the inventive modification of the cellulose fibers, the fibers have an additional functionality so that turbidity-causing proteins and/or protein-tannin compounds can be removed by filtration. Therefore this creates an increase in value, which substantially improves not only the investment cost but also the operating cost of a brewery due to the reduction in the use of and/or complete avoidance of additional stabilizers.

In one embodiment of the invention, the fiber mixture according to method step (a) consists of 92-99 wt % cellulose fibers, 1-8 wt % sodium croscarmellose and 0.4 wt % of one or more additives.

In another embodiment of the invention, the fiber mixture according to method step (a) is selected from a composition consisting of 90-99.9 wt % cellulose fibers, 0.1-5 wt % sodium croscarmellose and 0-5 wt % of one or more additives or 90-99 wt % cellulose fibers and 1-5 wt % sodium croscarmellose and 0-5 wt % of one or more additives. A composition containing 96 wt % cellulose fibers, 3 wt % sodium croscarmellose and 1 wt % additives is especially preferred.

According to additional embodiments, the additives are selected from the group consisting of pectins, carrageenans, isinglass, hydrocolloids, starch, gallotannins, silica sol, silica gel, polyvinyl pyrrolidones and/or polyvinylpolypyrrolidone (PVPP). Due to the use of additives, in particular pectins, carrageenan, isinglass, hydrocolloids, starch, the industrial usability can be improved and the filtration efficacy can also be increased. Thus, a further improvement in the modified cellulose fibers and in particular an improved filtration of protein constituents or metal ions, for example, can be achieved.

The pH according to method step (d) is adjusted with at least one acid, preferably hydrochloric acid (HCl), and/or with at least one base, preferably sodium hydroxide (NaOH), to a pH of pH 6-pH 13, alternatively to pH 7-pH 12, pH 8-pH 11, pH 8-pH 12, pH 9-pH 11, pH 7-pH 10, pH 11-pH 12, further alternatively with sodium hydroxide to a pH>9 or with sodium hydroxide to a pH between pH 11-pH 13.

To lower the pH, acids from the group of acids containing hydrochloric or phosphoric acid or mineral acids such as sulfuric acid and nitric acid or sulfurous acid may be used. To increase the pH, bases from the group of bases containing sodium hydroxide, ammonia, lime water, amines may be used.

The cellulose fibers as the main function ingredient are selected from the group of fibers containing cellulose, cellulose-based fibers, fibers made of grains, wood, bamboo, wood chips, wood wastes or mixture of same, and wherein the fibers have an average fiber length in the range of <1 μm to 500 μm.

As an additive function substance, 0.1-10 wt % sodium croscarmellose is present as a water-insoluble variant of carboxymethylcellulose.

Additives from the group of pectins, carrageenans, isinglass, hydrocolloids, starch, gallotannins, silica sol, silica gel, polyvinylpyrrolidone and/or polyvinylpolypyrrolidone are used as the additives.

When using the modified or optionally dried or isolated cellulose fibers for artificial clarification, the modified cellulose fibers have a pH in the range of pH 5 to pH 8 when the cellulose fibers that have been modified according to the invention are dissolved or swollen again in water.

In addition, the invention provides a filter aid which contains one or more cellulose fibers modified according to the invention. This filter aid can be produced as a deadend tubular filter, for example, or as a deadend sheet filter. To do so, the fibers that have been modified according to the invention and optionally dried are layered, tamped, absorbed, pressed or poured in accordance with the technical requirements.

The filter aid is preferably used in a method for artificial clarification of turbidity-causing substances from a liquid with a precoating of the filter aid in a first step, for filtration of the liquid to be clarified through the filter aid in a second step and for use of the filter aid as a running dosage during filtration in a third step.

The method is not limited to the steps listed here and instead additional steps and/or intermediate steps may also be carried out. The use of a filter aid is also not limited to a single filter aid and/or the steps listed. Instead, various filter aids of different mixtures and percentage amounts by weight of the main function ingredients and/or auxiliary function substances and/or one or more additives may be used.

Deadend filtration is described here as an example of a method for artificial clarification. In deadend filtration, for example, a deadend tubular filter is used. In addition, a deadend sheet filter and/or a sheet filter may be used.

Various experiments in adjusting the method according to the invention and producing the modified cellulose fibers as well as the results thereby achieved are explained in greater detail below, wherein these experiments explain the invention only as an example on the basis of laboratory experiments and experiments in the research brewery of TU Berlin and do not constitute a restriction on the general idea of the invention with respect to modifications.

EXAMPLES

To better evaluate the suitability of the modified cellulose fibers, beer filtration experiments were conducted with the cellulose fibers (fiber A and fiber B).

Before that, the comparative filtration and/or reference filtration was carried out using the filter aid diatomaceous earth on the Filtrox system. There were two precoatings (VA) and filtration (Table 2).

Figure 1:
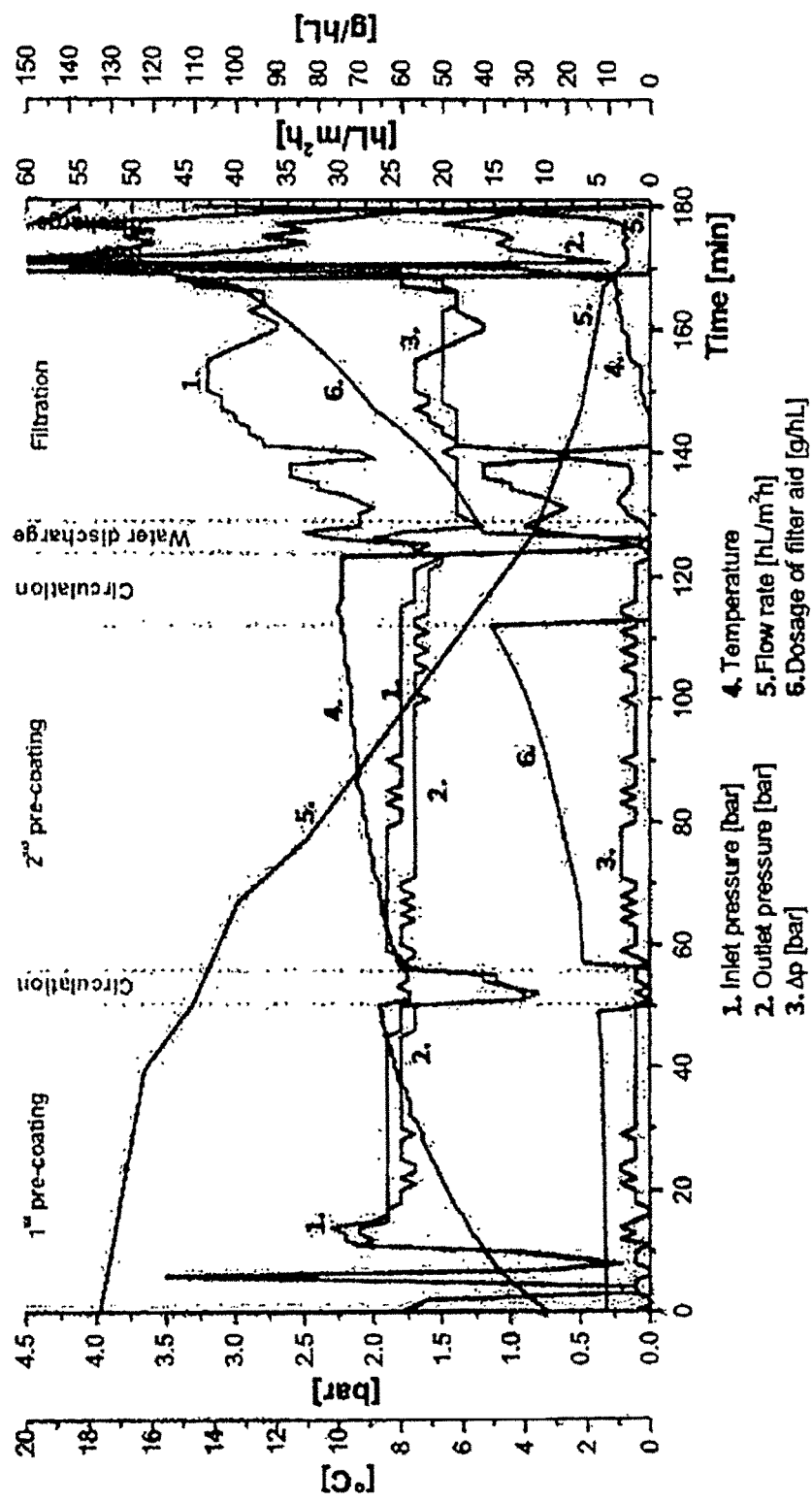
FIG. 1 shows the filtration curve of the Filtrox filtration experiments with diatomaceous earth.

Immediately after the start of filtration, a significant increase in the differential pressure can be discerned (FIG. 1). However, the filtration was not carried out at a constant flow rate but instead at the flow rate that was automatically adjusted, depending on the resistance. The filter tube was completely closed after the first coating and the turbidity values were in a very good range for the pilot filter plant with 0.9/0.3 EBC 90° C./25° C.

TABLE 2

| Two precoatings | Filtration |
|---|---|
| Diatomaceous earth type 3500: 82 g (corresponding to 600 g/m³) in 3 liters of water | 20 min first runnings (37.3 kg) Running dosage: 100 g/hL diatomaceous earth type 1200 and diatomaceous earth type 200 (2:1) |
| Diatomaceous earth type 1200 and diatomaceous earth type 200: 82 g (2:1) in 3 liters of water | Three filtrate drums - beginning, middle, end |
| Circulating pump: 10%, throttled to 4.0 L/min (17.6 hL/m²h) | |
| Dosage pump: frequency 100%, vol. 25% | |
| Dosage duration: 27 min | |
| Circulation: approx. 10 min | |

In comparison with the diatomaceous earth reference filtration, a cellulose fiber filtration was always carried out on the same Filtrox system using a dosage adapted to the modified cellulose and/or cellulose-based fibers.

Figure 2:
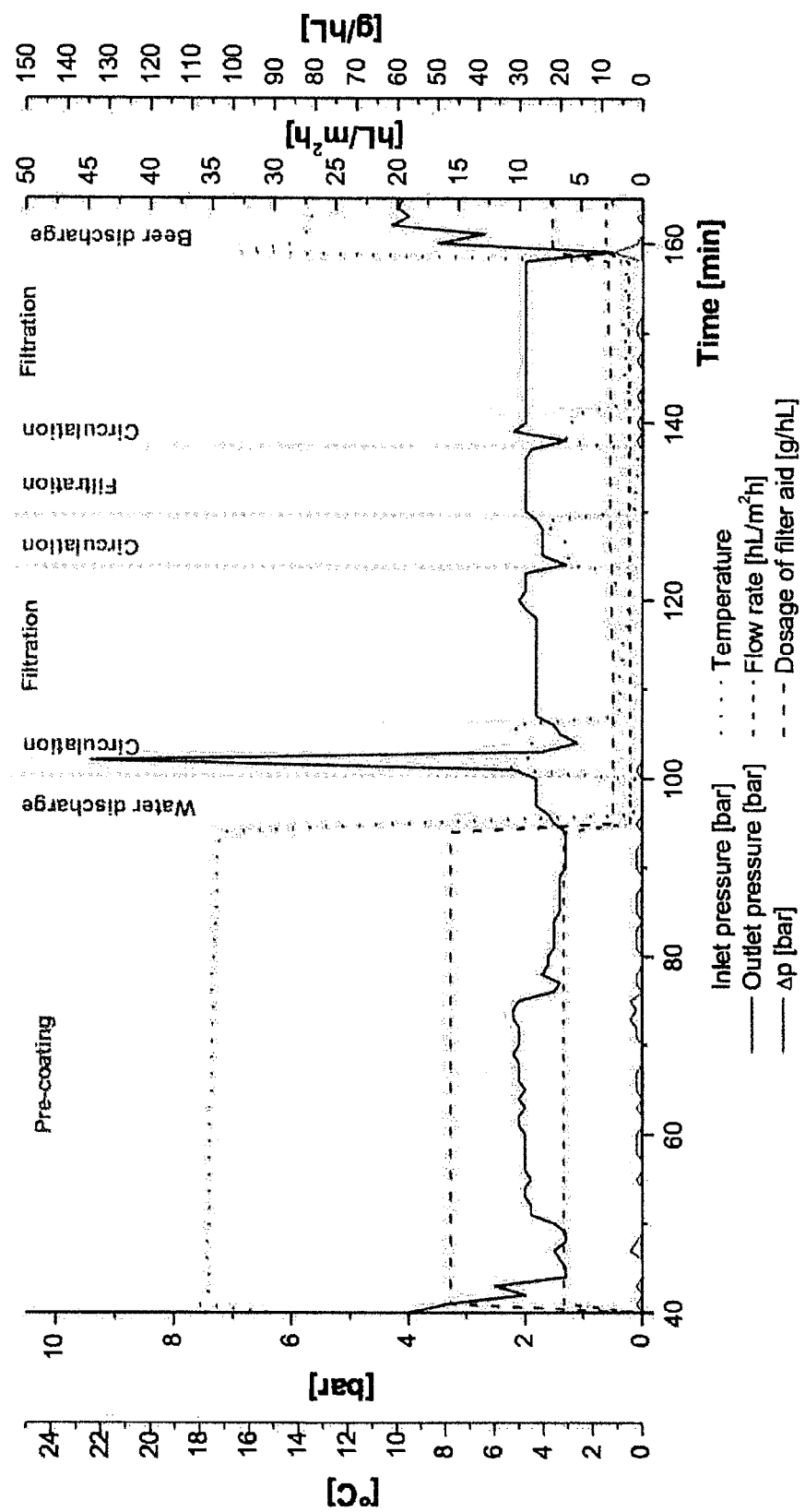
FIG. 2 shows the filtration curve of the Filtrox filtration experiments with crude fiber/modified cellulose fiber A.
Figure 3:
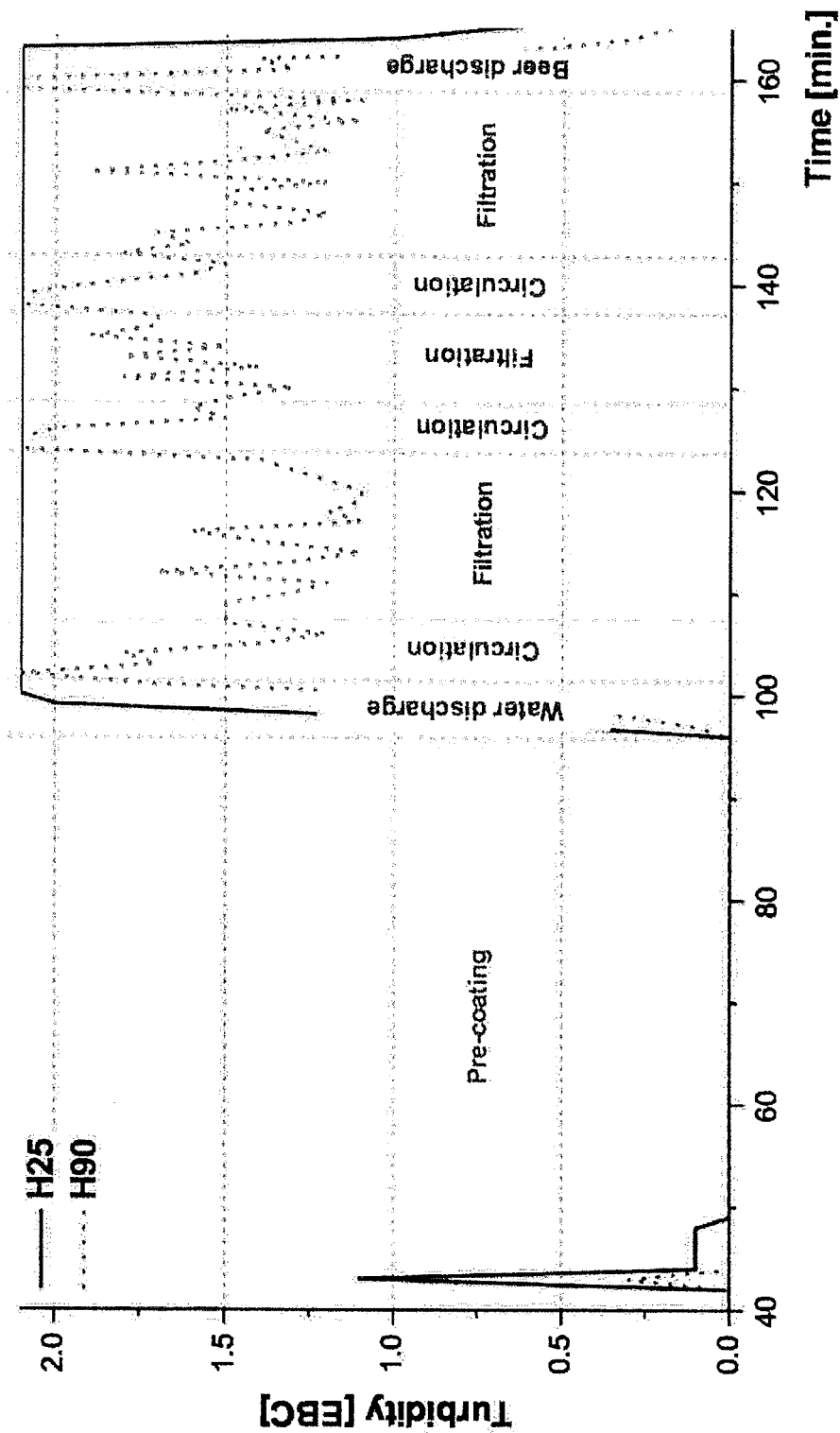
FIG. 3 shows the turbidity curve over the entire filtration experiment with crude fiber/modified cellulose fiber A.

For the cellulose fiber filtration, a precoating and the filtration were carried out (Table 3). FIG. 2 illustrates the atypical filtration curve of filtration with a crude fiber. As soon as the filter was filled with beer, the 25° C. value was outside of the turbidity measurement range (>2.1 EBC) (FIG. 3). The filtration performance of the cellulose-based fiber (crude fiber) A was not adequate for filtration of beer at 20° C. because of turbidity values of 1.4/1.8 EBC 90° C./25° C. At 0° C., the values are in the turbidity range (>2 EBC) with 3.5/2.5 EBC 90° C./25° C.

TABLE 3

| Precoatings | Filtration |
|---|---|
| 1000 g fiber/m² in 5 liters of water | 13 kg first runnings |
| Circulating pump: 10%, throttled to 11.5-12 L/min | Running dosage: 60 g fiber/hL |
| Dosage pump: frequency 100%, vol. 40% | Two filtrate drums of 30 L - beginning, end |
| Dosage duration: approx. 40 min | |
| Circulation: approx. 20 min | |

As a result it can be concluded that

Filtration aids and/or crude fibers based on unaltered cellulose can be used in conventional plant technologies for filtration;

Cellulose-based filter aids can be considered to be a permanent filter aid because it is produced from renewable raw materials;

Disposal of cellulose-based fibers/filter aids after filtration can be classified as unproblematical.

The cellulose-based crude fibers and/or corresponding filter aids that are used exhibit good properties of a filter aid in coating in general (rapid circulation and thus rapid throughput time, homogeneous distribution and thus low filter resistance) but they do not have an adequate filtration performance, i.e., despite the relatively great layer thicknesses, the beer is not filtered or is not filtered until clear in accordance with the claim when using the forms and cut sizes used so far. Because of the high turbidity values, the crude fibers based on untreated cellulose with >40 EBC (90° C.) and >15 EBC (25° C.) must be classified as unsuitable for filtration of beer.

Figure 4:
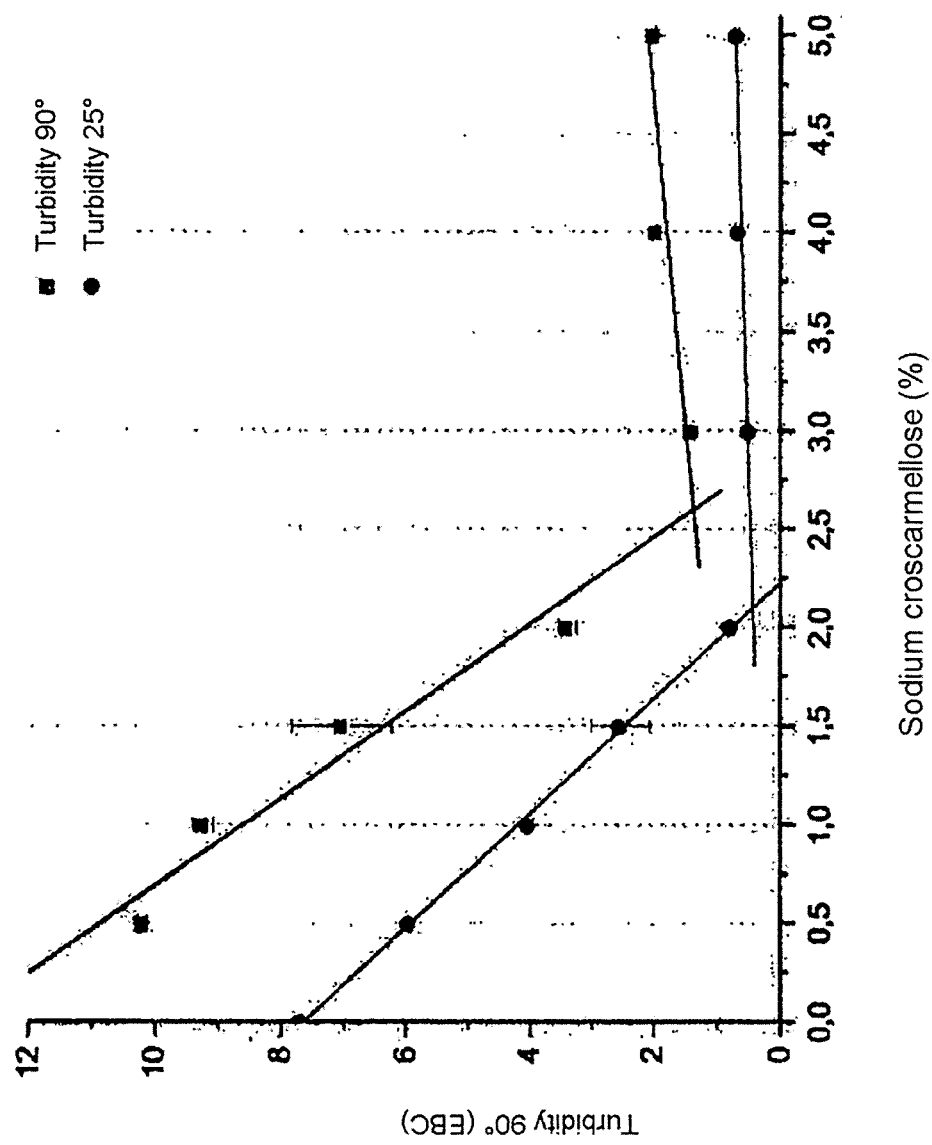
FIG. 4 shows the behavior of modified cellulose fibers with various amounts of sodium croscarmellose.

Various amounts (0, 0.5, 1, 1.5, 2, 2.5, 3, 4, 5%) sodium croscarmellose were used for workup of the cellulose-based crude fibers according to the invention, and the altered filter properties were checked by using a Stabifix Filter Check apparatus. Crude cellulose fiber A was therefore modified with sodium croscarmellose according to the method according to the invention. FIG. 4 shows the data determined in the lab filter test using the Stabifix Filter Check apparatus.

The Stabifix Filter Check apparatus measurement method is based on the MEBAK—Industrial Brewing Analytical Methods for Wort, Beer, Mixed Beer Beverages, Compilation of Methods of the Central European Industrial Brewing Analysis Commission, self publishers of the MEBAK, D-85350 Freising-Weihenstephan, 2012, ISBN 978-3-9805814-6-2, pages 271-273, point 2.20.2, and the method was modified in this regard to conform to additional requirements.

The use of 0.5 wt % sodium croscarmellose for workup resulted in an improvement in the turbidity values only to a limited extent, but significantly improved turbidity values were obtained in the ranges of Stabifix (laboratory-scale) diatomaceous earth filtration with values of 3.4 EBC (90° C.) and/or 0.8 EBC (25° C.).

Up to the amount of approx. 2.5% sodium croscarmellose for workup, there is a further significant improvement in the filtration properties. At higher amounts of sodium croscarmellose, the turbidity appears to lie in a linear region.

Figure 5:
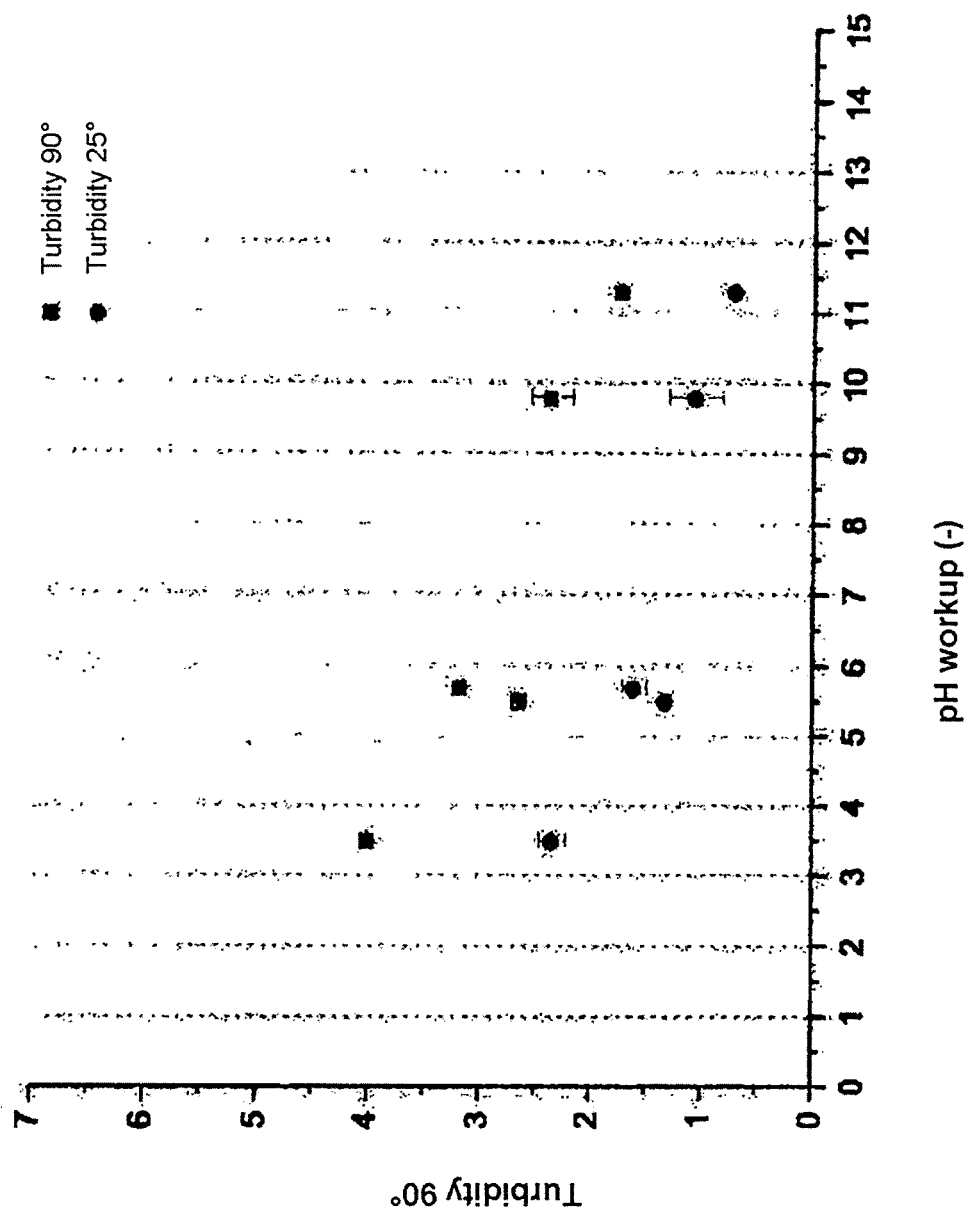
FIG. 5 shows the experiments with different pH levels in the workup of the modified fibers with 2 wt % sodium croscarmellose.

In another preliminary experiment, the influence of the pH on workup was ascertained (Table 4). The cellulose fiber A was modified by the method according to the invention with sodium croscarmellose with a pH adjusted in the range of pH 3 to pH 5, with no change in pH and/or in a pH range from pH 9 to pH 11 by the method according to the invention. A significant improvement in filtration performance was achieved only beyond a pH in the neutral to alkaline range. FIG. 5 shows the results with 2 wt % sodium croscarmellose in the pH range of pH 3 to pH 11.5. Another definite improvement in filtration properties can be seen in the pH range >9.

TABLE 4

Turbidity values after filtration using cellulose fiber A processed with sodium croscarmellose

| Fiber | Sodium croscarmellose addition % | pH | Turbidity 90° EBC | Standard deviation EBC | Turbidity 25° C. EBC | Standard deviation EBC |
|---|---|---|---|---|---|---|
| Diatomaceous earth | — | — | 2.3 | 0.2 | 0.7 | 0.1 |
| Cellulose fiber A | — | — | 45.3 | 1.5 | 18.1 | 1.7 |
| Cellulose fiber A | 2 | 3.5 | 4.0 | 0.01 | 2.34 | 0.12 |
| Cellulose fiber A | 2 | 5.5 | 2.6 | 0.05 | 1.3 | 0.03 |
| Cellulose fiber A | 2 | 5.7 | 3.2 | 0.03 | 1.6 | 0.11 |
| Cellulose fiber A | 2 | 9.8 | 2.4 | 0.19 | 1.1 | 0.24 |
| Cellulose fiber A | 2 | 11.3 | 1.7 | 0.01 | 0.7 | 0.01 |
| Cellulose fiber A | 3 | 9.3 | 2.2 | 0.06 | 0.7 | 0.03 |
| Cellulose fiber A | 3 | 11.1 | 1.5 | 0.01 | 0.6 | 0.04 |

In a subsequent experiment with the Filtrox installation, a cellulose fiber based on fiber A modified by the method according to the invention and containing an amount of 2 wt % sodium croscarmellose was worked up. In comparison with the diatomaceous earth reference filtration, filtration with the modified cellulose fibers was carried out on the same Filtrox installation using a dosage adapted to the cellulose-based crude fiber. For fiber filtration with the modified cellulose fiber, a precoating and filtration were carried out (Table 5).

TABLE 5

| Precoatings | Filtration |
|---|---|
| 1000 g fiber/m² in 5 liters of water Circulating pump: 10%, throttled to 11.5-12 L/min Dosage pump: frequency 100%, vol. 40% Dosage duration: approx. 40 min Circulation: approx. 20 min | 13 kg first runnings, then 5 minutes circulation Running dosage: 60 g modified fiber/hL Two filtrate drums of 30 L - beginning, end Height of layer for precoating Height of layer at end of filtration 12.5 ± 0.3 mm Turbidity EBC 90° C./25° C.; 0.9/0.4 |

Figure 6:
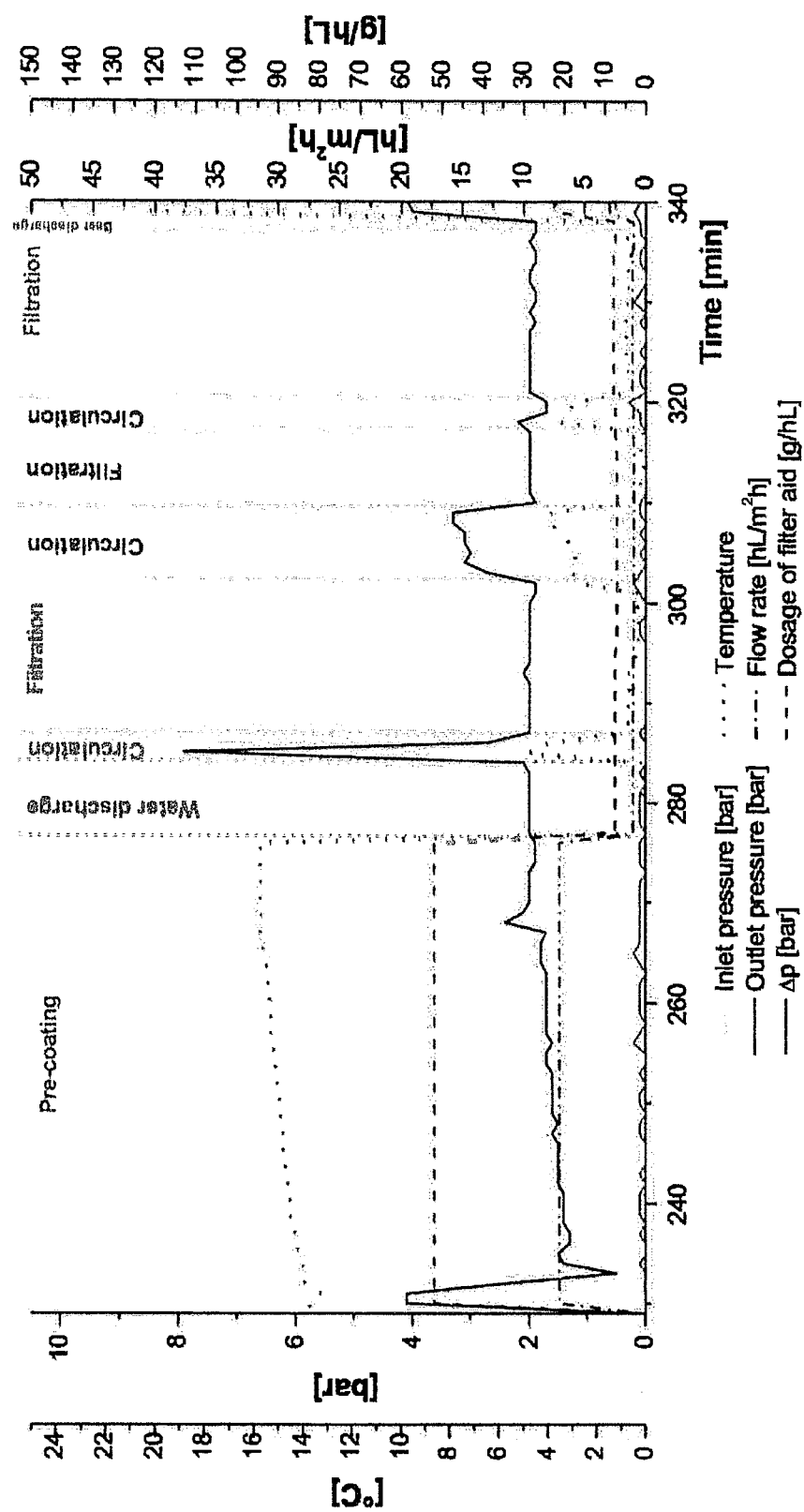
FIG. 6 shows the filtration curve of the experiment with sodium croscarmellose-modified cellulose fiber A.

The filtration experiment with sodium croscarmellose-modified cellulose-based on fiber A shows a typical filtration curve (FIG. 6) in contrast with the curve for diatomaceous earth filtration (FIG. 1), but it is comparable to the curve for crude fiber A filtration (FIG. 2). The atypical filtration curve thereby established is manifested in the differential pressure that is very low or even barely measurable during filtration. It can be concluded from this that a portion of the filtration effect is therefore based on absorption. In diatomaceous earth filtration, the differential pressure is the most important influencing factor, but here again, there is only minor absorption.

Figure 7:
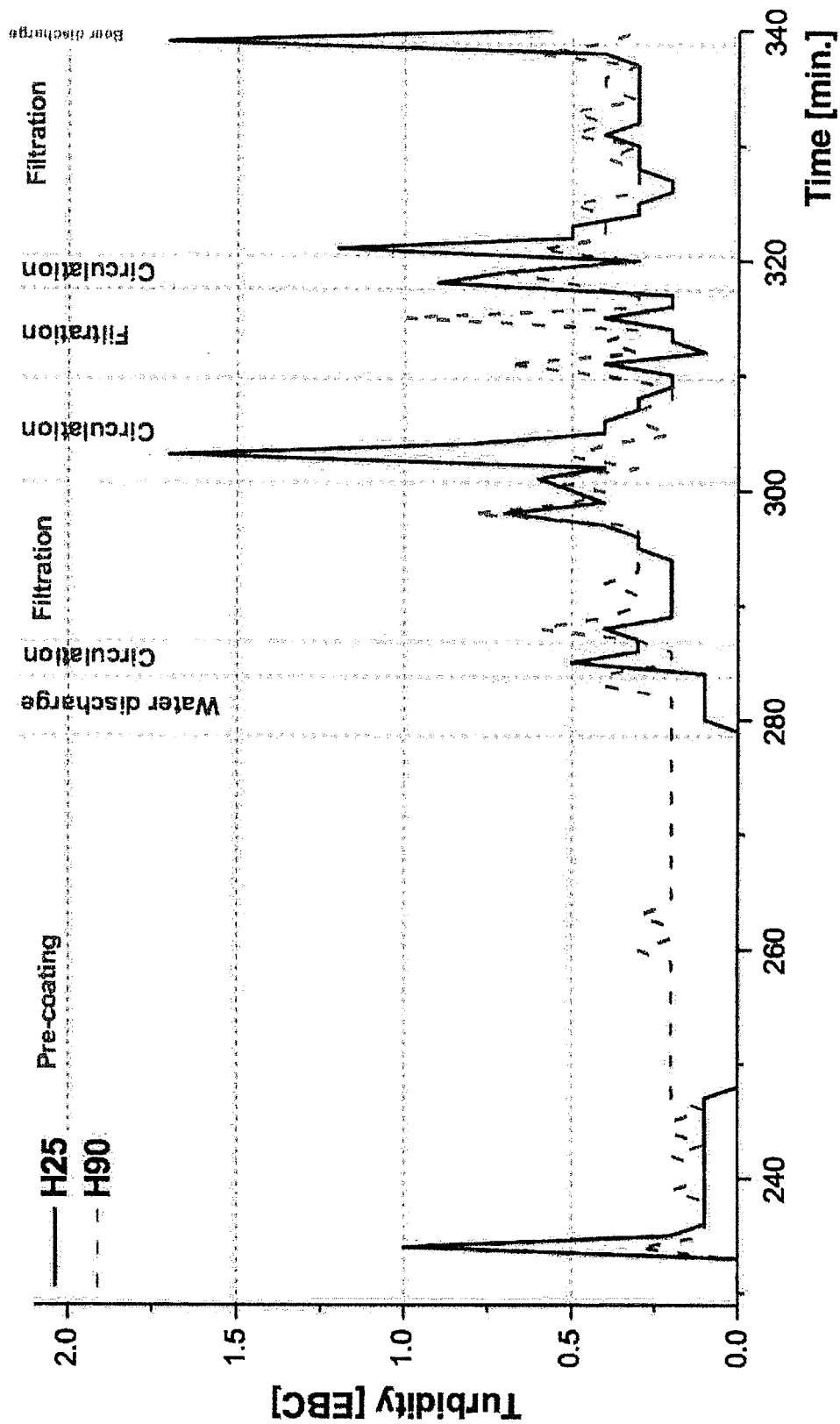
FIG. 7 shows the turbidity curve of the entire filtration time when using the modified cellulose fiber A.

The minor differential pressure when using sodium croscarmellose-modified cellulose fiber is very advantageous because this makes it possible to carry out filtration for a longer period of time and therefore to filter a greater volume. In the case of diatomaceous earth filtration, the filtration must be terminated at an admissible maximum pressure of 5-6 bar because of the steady increase in the differential pressure during filtration. This results from the steady increase in the filter layer because of the ongoing diatomaceous earth dosage, which ensures a uniform filtration performance with a rising input pressure. In filtration with sodium croscarmellose-modified cellulose fibers, filtration, which is definitely longer and therefore more economical, is possible due to the low and/or hardly measurable increase in the differential pressure. The turbidity values (FIG. 7) are much lower in comparison with those obtained by filtration using crude cellulose fibers (FIG. 3), and are all within the measurement range (<2.1 EBC). The turbidity measurements in the laboratory at 20° C. are also definitely in the range for a clear beer with 0.9/0.4 EBC (90°/25°). Furthermore, these values are in the same range as the values for diatomaceous earth filtration in the same Filtrox pilot plant (0.9/0.4 EBC 90°/25°). Even at 0° C. good turbidity values of 1.1/0.5 EBC (90°/25°) have been measured due to the use of the modified cellulose-based fibers; these turbidity values are in the invisible range. Therefore, a significant reduction to ⅓ of the turbidity value in comparison with that of the unprocessed cellulose-based fiber can be achieved.

It should be pointed out in particular that sodium croscarmellose and/or the modified cellulose-based fibers can bind proteins. Between the running dosage and achieving the filter cake, precipitation and/or flocculation can easily occur in a beer. Such precipitation and/or flocculation is bound by the cellulose fibers modified with sodium croscarmellose. Thus, a protein-side stabilization of turbidity can be achieved by filtration using cellulose fibers modified by the method according to the invention.

The results of the beer analysis of the unfiltered substance (beer) as well as filtered beer from experiments with 2 wt % sodium croscarmellose and crude cellulose fiber A are compared in Table 6.

TABLE 6

Result of standard beer analysis

| | | Unfiltered 1 | Cellulose fiber A beginning | Cellulose fiber A end | 2% NCM cellulose fiber A beginning | 2% NCM cellulose fiber A end |
|---|---|---|---|---|---|---|
| Original wort | °P | 12.1 | 11.5 | 11.7 | 11.5 | 11.5 |
| Extract, apparent | % w/w | 2.12 | 2.06 | 2.10 | 2.06 | 2.10 |
| Extract, actual | % w/w | 4.04 | 3.89 | 3.95 | 3.88 | 3.95 |
| Alcohol | % v/v | 5.31 | 5.02 | 5.09 | 5.01 | 5.09 |
| Color | EBC | 6.6 | 6.4 | 6.5 | 6.1 | 6.3 |
| pH | — | 4.42 | 4.41 | 4.40 | 4.41 | 4.40 |
| Turbidity, 0° C. 90° | EBC | >100 | 3.46 | 3.4 | 1.12 | 1.14 |
| Turbidity, 0° C. 25° | EBC | >100 | 2.45 | 2.26 | 0.53 | 0.53 |
| Turbidity, 20° C. 90° | EBC | >100 | 1.37 | 1.19 | 0.90 | 0.88 |
| Turbidity, 20° C. 25° | EBC | >100 | 1.42 | 1.09 | 0.43 | 0.38 |

In an additional experiment using a Filtrox plant, a cellulose fiber A modified by the method according to the invention was worked up with 3 wt % sodium croscarmellose, and a modified cellulose fiber B was worked up with an amount of 3 wt % sodium croscarmellose. In comparison with the diatomaceous earth reference filtration (Table 7), filtration with the modified cellulose fibers was carried out using the same Filtrox pilot plant with a dosage adapted to the modified crude cellulose fiber (Table 8). For cellulose fiber filtration (fiber A), precoating and filtration were carried out; a first and second precoating and filtration with an ongoing dosage were carried out for the combination A+B (modified cellulose fiber A and B, each containing 3 wt % sodium croscarmellose at pH 11) (Table 9).

TABLE 7

| Two precoatings | Filtration |
|---|---|
| Diatomaceous earth type 3500: 82 g (corresponding to 600 g/m²) in 3 liters of water | 20 min first runnings (37.3 kg) Running dosage: 100 g/hL diatomaceous earth type 1200 and diatomaceous earth type 200 (2:1) Three filtrate drums - beginning, end |
| Diatomaceous earth type 1200 and diatomaceous earth type 200: 82 g (1:1) in 3 liters of water | |
| Circulating pump: 10%, throttled to 4.0 L/min (17.6 hL/m²h) | |
| Dosage pump: frequency 100%, vol. 25% | |
| Dosage duration: 27 min | |
| Circulation: approx. 10 min | |

TABLE 8

| Precoatings | Filtration |
|---|---|
| 1000 g/m² modified fiber in 5 liters of water | 13 kg first runnings, then 5 minutes |

TABLE 8-continued

| Precoatings | Filtration |
|---|---|
| Circulating pump: 10%, throttled to 11.5-12 L/min | circulation Running dosage: 60 g modified fiber/hL Two filtrate drums of 30 liters each - beginning, end |
| Dosage pump: frequency 100%, vol. 40% | |
| Dosage duration: approx. 40 min | |
| Circulation: approx. 20 min | |

TABLE 9

| Two precoatings | Filtration |
|---|---|
| 500 g/m² modified fiber in 5 liters of water | 13 kg first runnings, then 5 minutes |
| Circulating pump: 10%, throttled to 11.5-12 L/min | circulation Running dosage: 60 g modified fiber/hL Two filtrate drums of 30 liters each - beginning, end |
| Dosage pump: frequency 100%, vol. 40% | |
| Dosage duration: approx. 40 min | |
| Circulation: approx. 20 min | |

Figure 8:
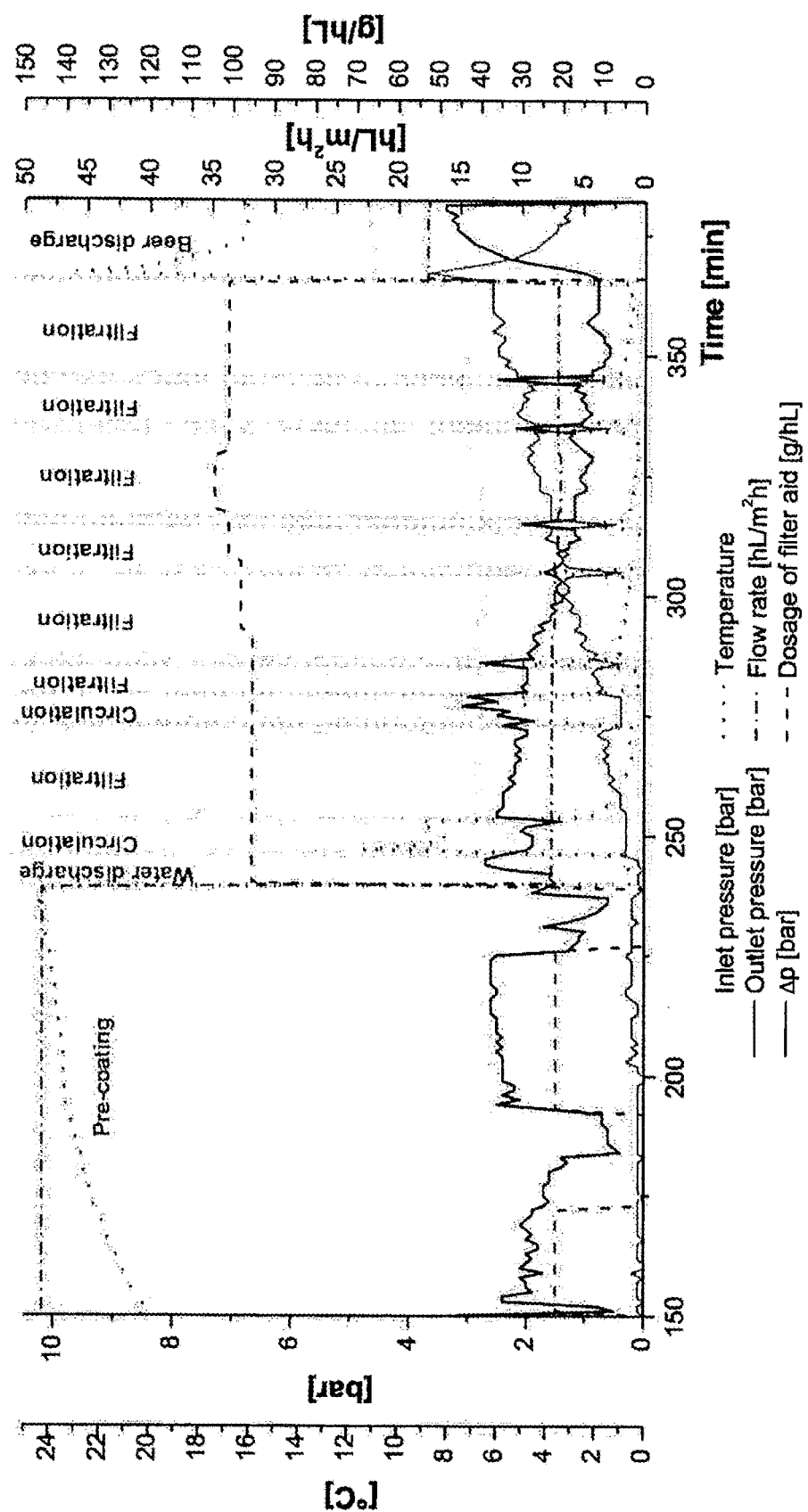
FIG. 8 shows the filtration curve with diatomaceous earth.
Figure 9:
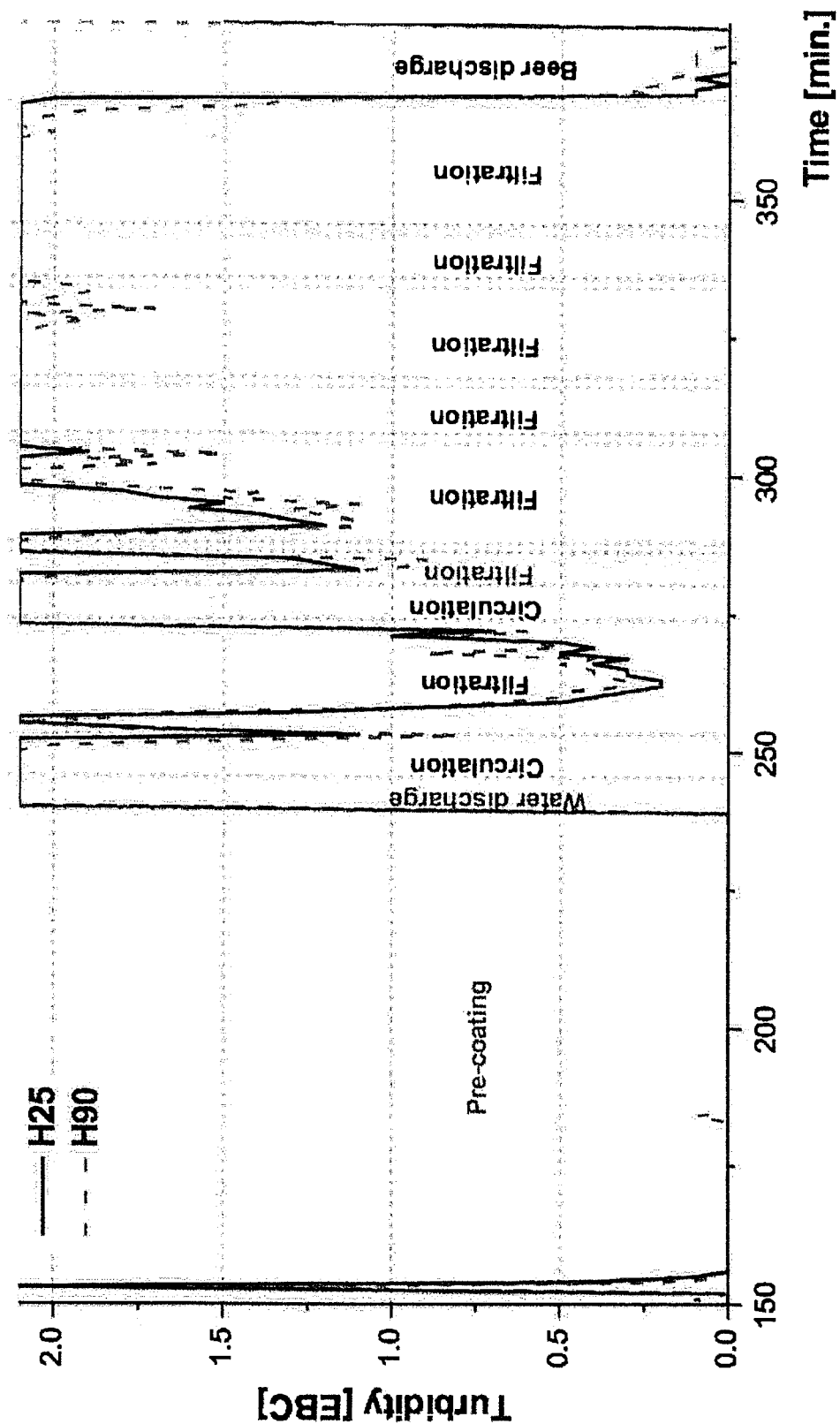
FIG. 9 shows the turbidity curve with diatomaceous earth.

Definite advantages of filtration using modified cellulose fibers can be seen from the key data in the figures shown. Thus, FIG. 8 shows the filtration curve of a normal diatomaceous earth filtration. As is customary in diatomaceous earth filtration, the differential pressure increases almost linearly. The turbidity values from the inline measurement (FIG. 9) are not directly in the range of a diatomaceous earth filtration, as is customary industrially, where the measured values are always somewhat elevated in the pilot plant.

Figure 10:
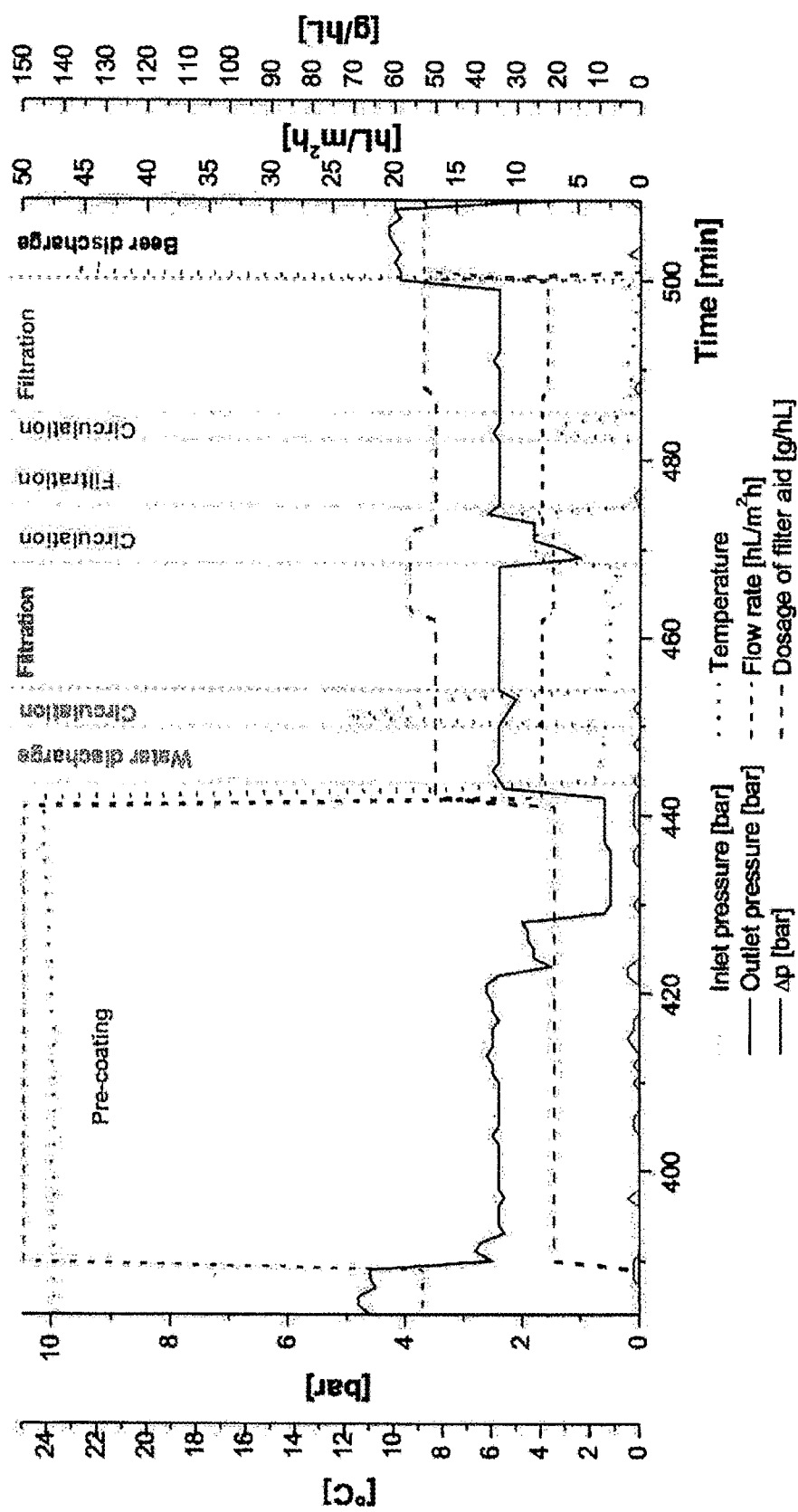
FIG. 10 shows the filtration curve with crude fiber/modified cellulose fiber A.
Figure 11:
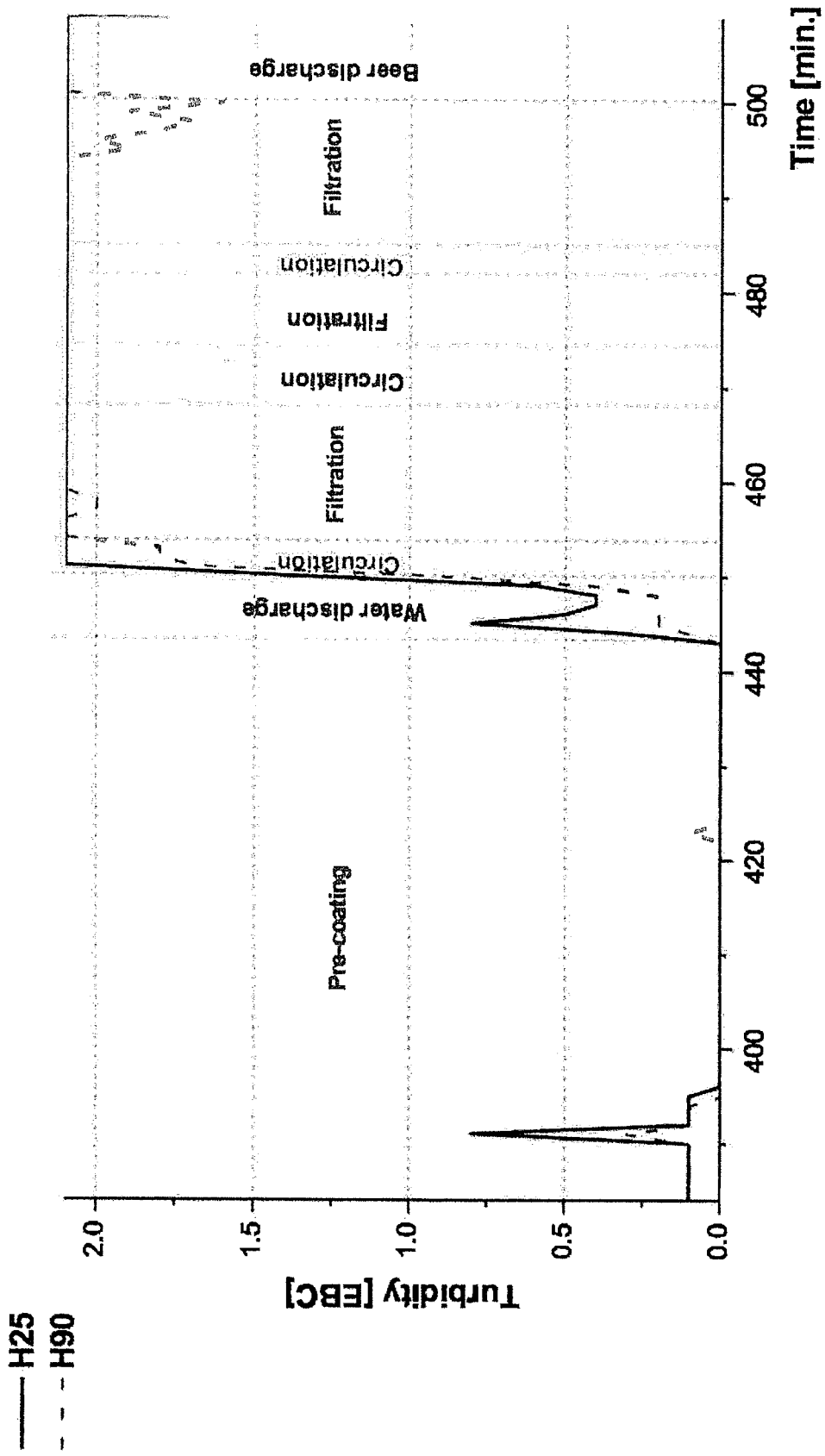
FIG. 11 shows the turbidity curve with crude fiber/modified cellulose fiber A.

In crude fiber filtration (cellulose fiber A) a highly atypical filtration curve is again obtained (FIG. 10) and there is no measurable pressure difference. The turbidity values are very high and are permanently outside of the measurement range (FIG. 11).

Figure 12:
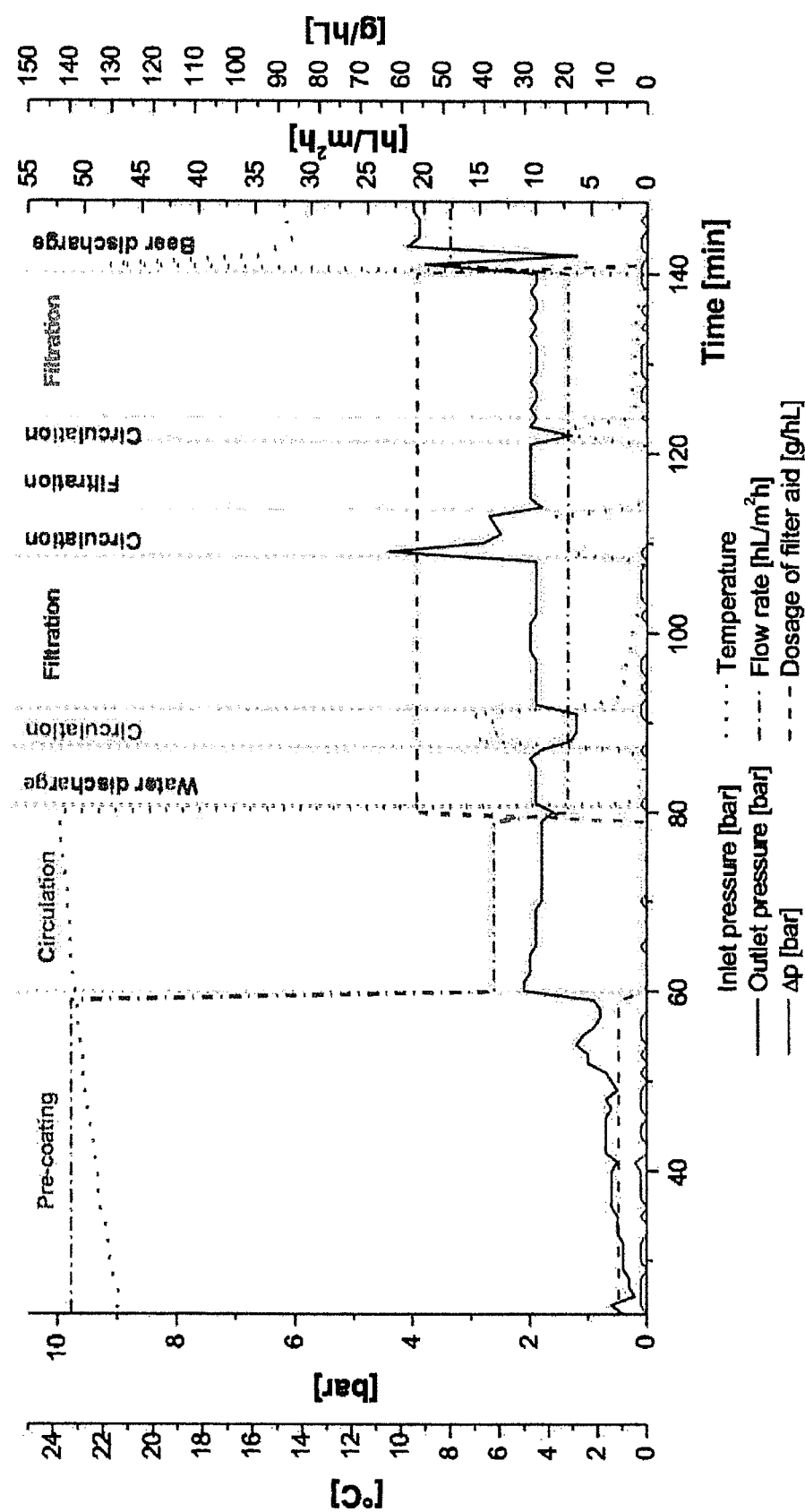
FIG. 12 shows the filtration curve with modified cellulose fiber A with 3 wt % sodium croscarmellose at pH 11.
Figure 13:
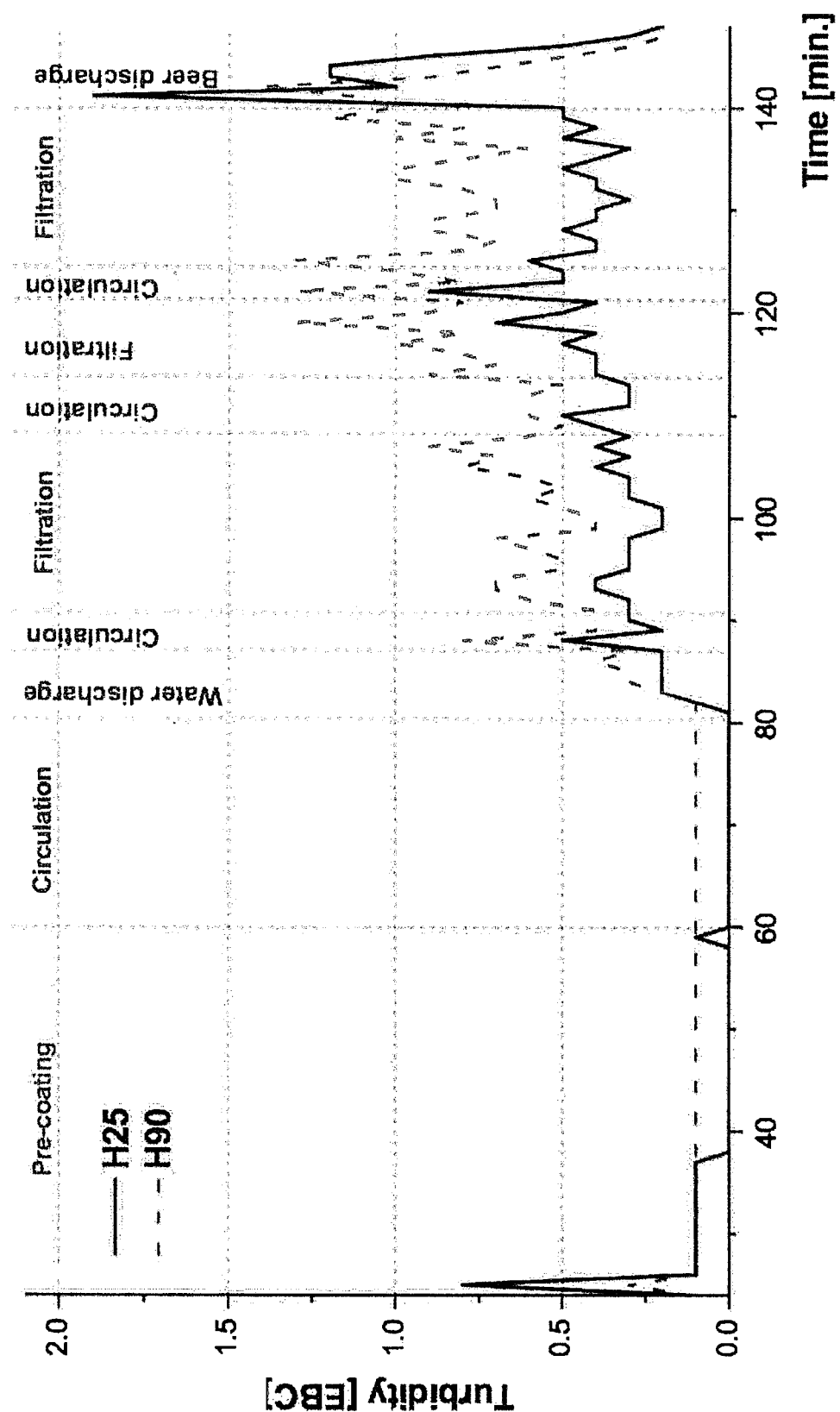
FIG. 13 shows the turbidity curve with modified cellulose fiber A with 3 wt % sodium croscarmellose at pH 11.
Figure 14:
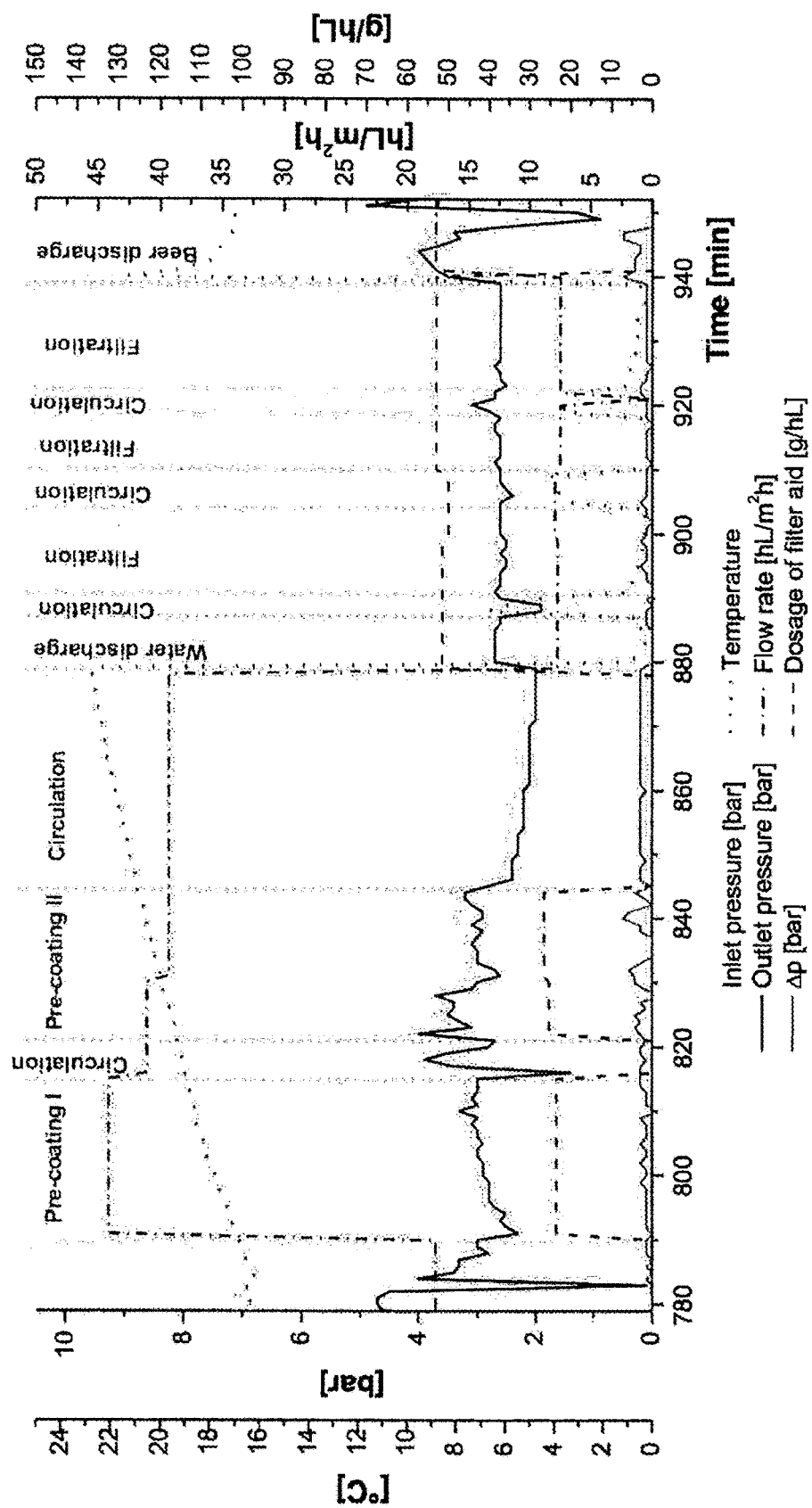
FIG. 14 shows the filtration curve with modified cellulose fibers A and B with 3 wt % sodium croscarmellose at pH 11.
Figure 15:
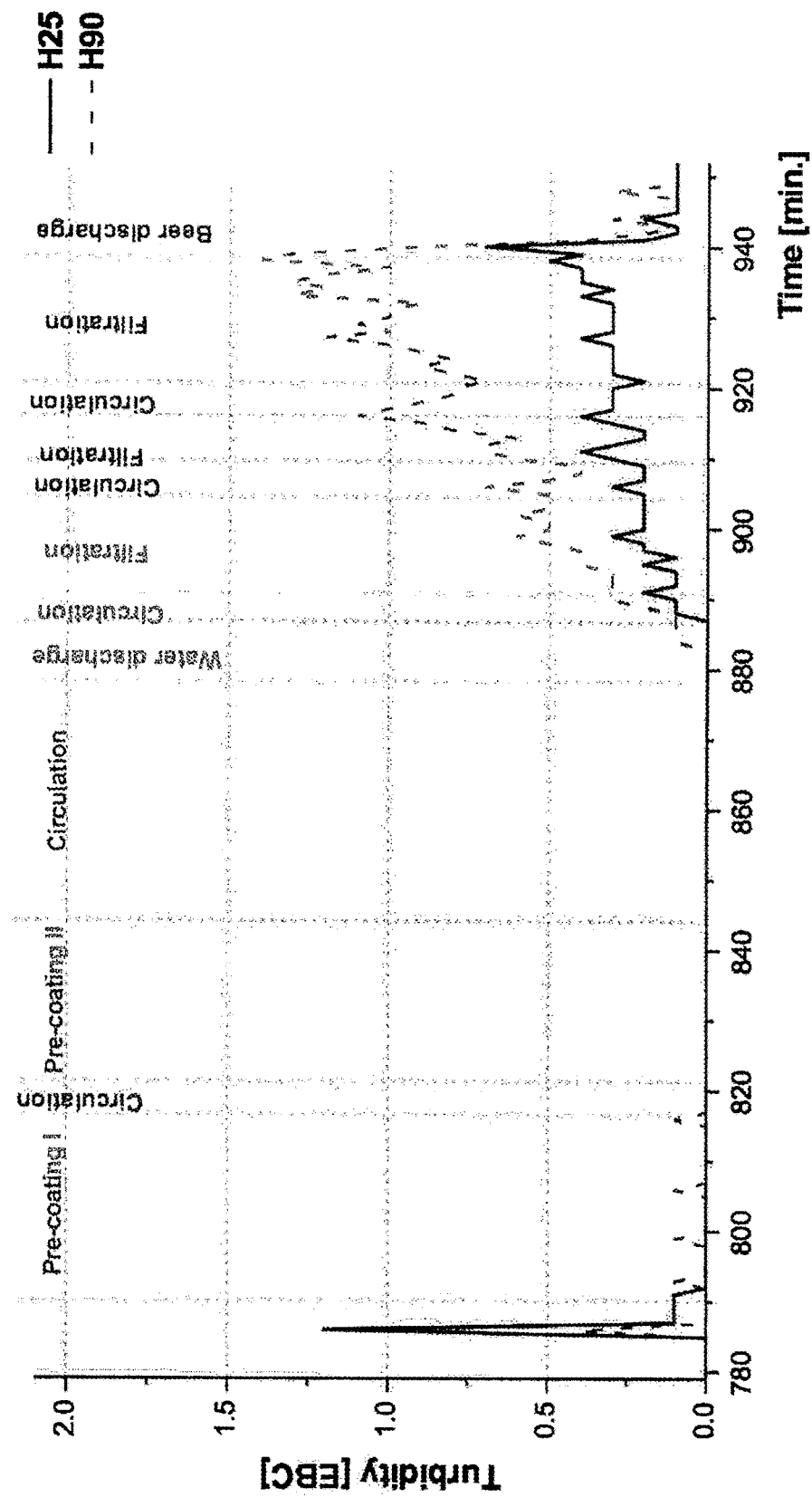
FIG. 15 shows the turbidity curve with modified cellulose fibers A and B with 3 wt % sodium croscarmellose at pH 11.

A similarly atypical filtration curve in filtration with modified cellulose fiber A (modified with 3% sodium croscarmellose at pH 11) can be seen, like that with crude fiber A (FIG. 12). The turbidity values (FIG. 13) can be measured inline over the entire filtration period and increase only slightly over the filtration time. The experiment with two precoatings (cellulose fiber A with 3% sodium croscarmellose, pH 11 and cellulose fiber B with 3% sodium croscarmellose pH 11) also shows almost no pressure different (max. 0.2 bar) over the filtration curve (FIG. 14). Here there is a stronger linear increase in turbidity (FIG. 15) during filtration.

Table 10 shows the results obtained by beer analysis of the unfiltered beer as well as the filtered beers from the experiments with diatomaceous earth, crude cellulose fiber A, cellulose fiber A with 3 wt % sodium croscarmellose and pH 11 and cellulose fiber A/cellulose fiber B, each with 3 wt % sodium croscarmellose and pH 11. The original wort contents show a slight dilution effect in comparison with the unfiltered beer, which is due to the technical aspects of the process. However this dilution is comparable in all the experiments that were conducted, which is also reflected in the extra values and in the individual alcohol content. In the case of diatomaceous earth as well as the modified cellulose fiber filtration, the color values reveal a natural decline due to the filtration process. The pH is comparable in all beers and a slight decline in $SO_2$ can be explained by the minor dilution effect as well as a small amount of oxygen input during filtration. The polyphenol contents are significantly lower in comparison with the diatomaceous earth when using the modified cellulose fiber A. This has a positive effect on the colloidal beer stability, the tendency to turbidity during storage/aging is reduced. A greater discharge due to the modified cellulose fibers can also be detected with the free amino nitrogens in comparison with diatomaceous earth. The turbidity values do not yet correspond on the whole to the guideline values for a clear beer, but again there is a significant improvement when using modified cellulose fiber (diatomaceous earth 2.2/2.5 EBC (90°/25°), crude cellulose fiber 3.1/3.9 EBC (90°/25°) and modified cellulose fiber A 1.5/1.3 EBC (90°/25°)). The turbidity values obtained for filtration using modified cellulose fibers are below the reference diatomaceous earth filtration on the same pilot plant. In other words, by using modified cellulose fibers in comparison with diatomaceous earth, the resulting beer has at least a comparable clarity. A further improvement can be expected by a further adaptation of the process here. In combined use of modified cellulose fiber A and modified cellulose fiber B, another significant increase in the filtration performance (lower turbidity values 1.0/0.8 EBC (90°/25°)) can be detected at the beginning of filtration. At cold temperatures (0° C.), values at least equal to those obtained in diatomaceous earth filtration are achieved by using modified cellulose fibers. An adaptation in the filtration parameters (amount of coating, running dosage, amount of croscarmellose, fiber geometry) is possible when using modified cellulose fibers, depending on the quality of the unfiltered beer, so that even beer that is difficult to filter can be filtered to yield a clear product without an increase in the pressure difference.

Figure 16:
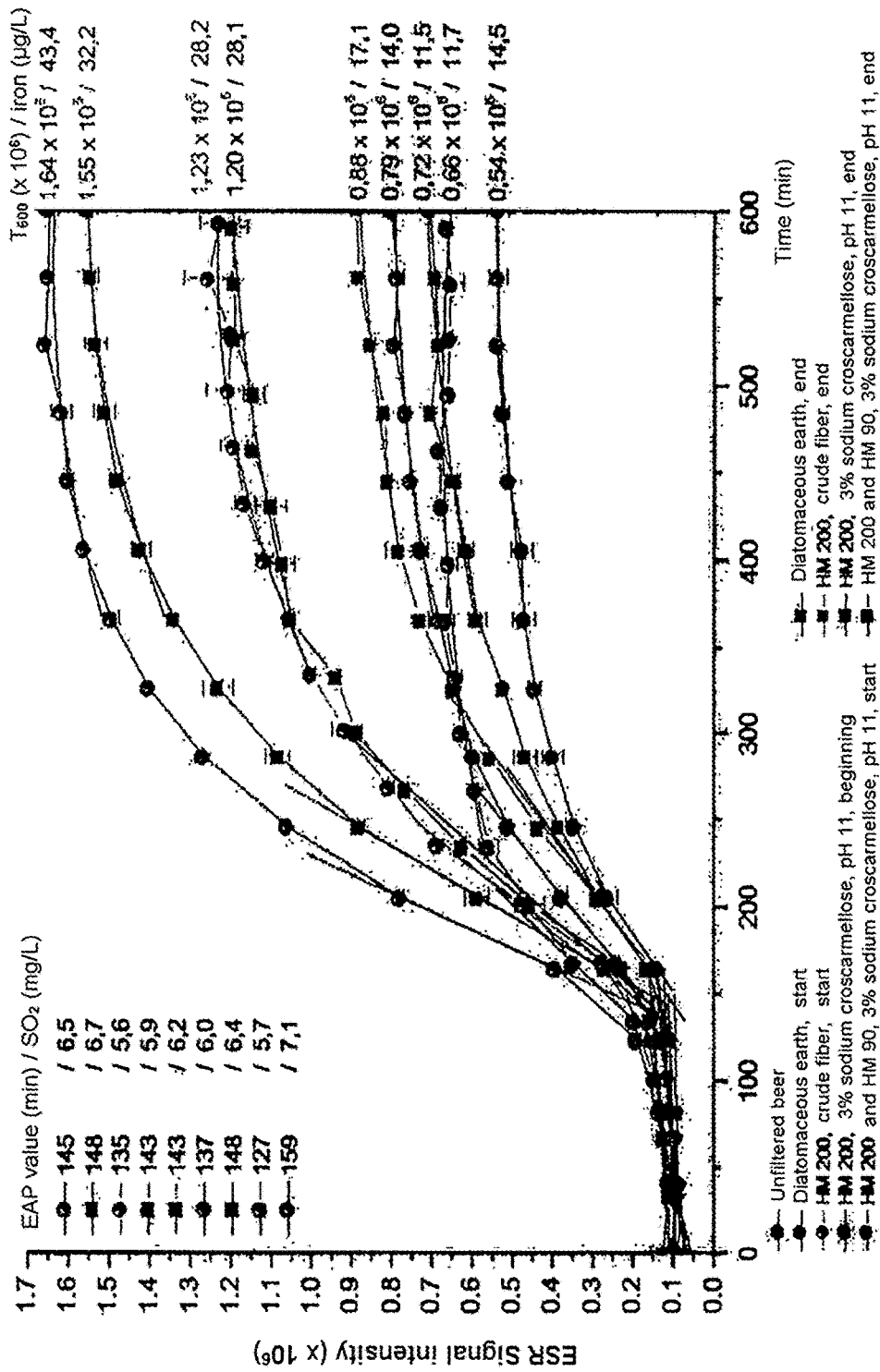
FIG. 16 shows the ESR measurement of beers from additional experiments.

FIG. 16 shows the ESR measurement (electron spin resonance measurement) of beers for investigating the filtration influences on the oxidative stability of beer. The results of the EAP determination (endogenous antioxidative potential) illustrate the basic advantage of a cellulose fiber filtration in comparison with diatomaceous earth filtration because significantly less iron is introduced into the beer in comparison with diatomaceous earth. Therefore, the oxygen activation is reduced by iron ions and fewer radical are formed by the Fenton reaction system. Subsequently the filtration-induced loss of endogenous antioxidative potential of beer is reduced and the taste stability over storage time is prolonged. This is true in particular of the sodium croscarmellose-modified cellulose fibers. When using crude cellulose fibers, a $T_{600}$ value can be achieved with approx. half the ESR signal intensity of diatomaceous earth and generation of radicals is greatly reduced accordingly. Furthermore, there is a discernible difference between the beginning and end of the crude fiber filtration because during the filtration process the iron is washed out of the filter cake (Table 10) when using modified cellulose fibers with sodium croscarmellose, the ESR signal intensity is almost ideally at the level of the unfiltered beer, so that the negative effect of diatomaceous earth filtration can be prevented almost completely. The explanation is given by the fact that a large amount of the iron is already removed from the cellulose fibers due to the workup of the cellulose fiber A according to the invention, and therefore iron can no longer enter the beer. The slightly elevated ESR value can be explained by a low level of oxygen input during filtration.

When using processed cellulose fiber B, there is a greater input of iron into beer due to technical conditions because of the lower discharge of iron in fiber processing. This becomes significant as soon as the capacity of the underlying filter cake of modified cellulose fiber A is exhausted. This is when the turbidity also increases. Regardless of that, it is possible, by adapting the processing according to the invention, to further minimize the input of iron even with the modified cellulose fiber B.

The EAP determination by electron spin resonance spectroscopy was carried out in accordance with the MEBAK Industrial Brewing Analytical Methods for Beer Wort and Mixed Beer Beverages, Compilation of Methods of the Central European Industrial Brewing Analysis Commission, self publication of the MEBAK, D-85350 Freising-Weihenstephan, 2012, ISBN 978-3-9805814-6-2, pages 207-218, point 2.15.3.

TABLE 10

Result of a standard beer analysis

|  |  | Unfiltered beer 3 | Diatomaceous earth beginning | Diatomaceous earth end | Cellulose fiber A beginning | Cellulose fiber A end | 3% NCM pH 11 cellulose fiber A beginning | 3% NCM pH 11 cellulose fiber A end | 3% NCM pH 11 cellulose fiber A + cellulose fiber B beginning | 3% NCM pH 11 cellulose fiber A + cellulose fiber B end |
| --- | --- | --- | --- | --- | --- | --- | --- | --- | --- | --- |
| Original wort | °P | 11.81 | 11.08 | 11.31 | 11.43 | 11.60 | 11.19 | 11.45 | 11.36 | 11.56 |
| Extract | % w/w | 1.99 | 1.90 | 1.95 | 1.96 | 1.99 | 1.91 | 1.95 | 1.92 | 1.95 |

TABLE 10-continued

Result of a standard beer analysis

| | | Unfiltered beer 3 | Diatomaceous earth beginning | Diatomaceous earth end | Cellulose fiber A beginning | Cellulose fiber A end | 3% NCM pH 11 cellulose fiber A beginning | 3% NCM pH 11 cellulose fiber A end | 3% NCM pH 11 cellulose fiber A + cellulose fiber B beginning | 3% NCM pH 11 cellulose fiber A + cellulose fiber B end |
|---|---|---|---|---|---|---|---|---|---|---|
| Extract | % w/w | 3.88 | 3.67 | 3.75 | 3.8 | 3.84 | 3.69 | 3.78 | 3.73 | 3.79 |
| Alcohol | % v/v | 5.21 | 4.85 | 4.96 | 5.02 | 5.09 | 4.91 | 5.03 | 5.00 | 5.09 |
| Color | EBC | 8.2 | 6.6 | 6.7 | 8.2 | 8.0 | 6.5 | 6.8 | | |
| pH | — | | 4.38 | 4.38 | 4.38 | 4.38 | 4.40 | 4.38 | 4.41 | 4.45 |
| Bitter unit | EBU | | 31.2 | 32.2 | 32.0 | 34.3 | 34.1 | 34.3 | 33.3 | 34.2 |
| Polyphenols | mg/L | | 207.8 | 204.3 | 209.4 | 213.8 | 191.1 | 197.3 | | |
| SO$_2$ | mg/L | 7.1 | 6.5 | 6.7 | 5.5 | 6.2 | 6.0 | 6.4 | 5.7 | 5.9 |
| Iron | μg/L | 14.5 | 43.4 | 32.2 | 28.2 | 17.1 | 14.0 | 11.5 | 11.7 | 28.1 |
| FAN | mg/L | 106.1 | 100.4 | 100.0 | 99.7 | 103.9 | 97.0 | 98.7 | | |
| Turbidity, 0° C. | EBC | >100 | 2.2 | 1.9 | 1.1 | 8.1 | 2.1 | 2.2 | 1.4 | 3.7 |
| Turbidity, 0° C. | EBC | >100 | 2.9 | 2.0 | 13.8 | 10.8 | 1.9 | 1.9 | 1.1 | 2.2 |
| Turbidity, 20° C. | EBC | >100 | 2.2 | 1.6 | 4.1 | 3.1 | 1.5 | 1.5 | 1.0 | 2.6 |
| Turbidity, 20° C. | EBC | >100 | 2.5 | 1.6 | 5.1 | 3.9 | 1.3 | 1.3 | 0.8 | 1.4 |

The invention claimed is:

1. A method for producing modified cellulose fibers for artificial clarification of turbidity-causing substances from beverages for human consumption, the method comprising the following steps:
   preparing a fiber mixture comprising 80-99.9 wt % cellulose fibers, 0.1-10 wt % sodium croscarmellose and 0-10 wt % of one or more additives;
   swelling and adjusting the volume and pH of the fiber mixture in a neutral to alkaline medium;
   heating the fiber mixture;
   washing the cooked fiber mixture to obtain a moist mass of the modified cellulose fibers; and,
   isolating the modified cellulose fibers to obtain a resulting finished fibers mixture for treatment for clarification of beverages for human consumption.

2. The method according to claim 1, wherein the fiber mixture for production of modified cellulose fibers is homogenized.

3. The method according to claim 1, wherein the cellulose fibers are selected from the group of fibers containing cellulose, cellulose containing fibers, fibers from grains, from wood, from bamboo, from wood chips, from wood wastes and mixtures of same, and wherein the fibers have an average fiber length in the range of <1 to 500 μm.

4. The method according to claim 1, wherein the fiber mixture according to step (a) comprises 92-99 wt % cellulose fibers, 1-8 wt % sodium croscarmellose and 0-4 wt % of one or more additives.

5. The method according to claim 1, wherein the fiber mixture according to step (a) is selected from a composition consisting of 90-99.9 wt % cellulose fibers, 0.1-5 wt % sodium croscarmellose and 0-5 wt % of one or more additives or from 90-99 wt % cellulose fibers and 1-5 wt % sodium croscarmellose and 0-5 wt % of one or more additives.

6. The method according to claim 1, wherein one or more additives are selected from the group of additives consisting of pectin, carrageenan, isinglass, hydrocolloids, starch, gallotannins, silica sol, silica gel, polyvinylpyrrolidone and polyvinylpolypyrrolidone as well as mixtures of same.

7. The method according to claim 1, wherein for workup of the fiber mixture, the pH is adjusted with at least one acid and/or with at least one base to a value between pH 6 and pH 13.

8. The method according to claim 1, further comprising after washing, drying the moist mass to a residual water content of 2-10 wt % to obtain a dry mass.

9. A method for producing modified cellulose fibers for artificial clarification of turbidity-causing substances from liquids, the method comprising the following steps:
   preparing a fiber mixture comprising 80-99.9 wt % cellulose fibers, 0.1-10 wt % sodium croscarmellose and 0-10 wt % of one or more additives;
   swelling and adjusting the volume and pH of the fiber mixture in a neutral to alkaline medium;
   heating the fiber mixture;
   washing the cooked fiber mixture to obtain a moist mass of the modified cellulose fibers; and,
   isolating the modified cellulose fibers to obtain a resulting finished fibers mixture,
   wherein the finished fiber mixture is processed in an additional method step using the moist mass to form filter aids and/or filter sheets.

10. The method according to claim 9 wherein the additional method step comprises at least one process selected from layering, tamping, absorbing, pressing, and pouring the moist mass of the modified cellulose fibers into filter units.

11. The method according to claim 10 comprising preparing a filter aid by inserting at least one of the filter units into at least one of: deadend tube filters, deadend sheet filters, deadend disk filters, deadend leaf filters and layered sheet filters.

12. The method according to claim 9 further comprising after washing, drying the moist mass to a residual water content of 2-10 wt % to obtain a dry mass, wherein the dry mass finished fibers mixture is processed using at least one selected from layering, tamping, absorbing, and pressing the dry mass modified cellulose fibers into dry mass filter units.

13. The method according to claim 12 further comprising preparing dry mass filter aids by inserting at least one of the dry mass filter units into at least one off; deadend tube filters, deadend sheet filters, deadend disk filters, deadend leaf filters and layered sheet filters.

* * * * *

UNITED STATES PATENT AND TRADEMARK OFFICE
CERTIFICATE OF CORRECTION

PATENT NO. : 10,501,606 B2
APPLICATION NO. : 16/060437
DATED : December 10, 2019
INVENTOR(S) : Kunz et al.

Page 1 of 1

It is certified that error appears in the above-identified patent and that said Letters Patent is hereby corrected as shown below:

In the Claims

In Claim 13, Column 21, Line 3:
Delete: "at least one off; deadend tube filters,"
Insert: --at least one of: deadend tube filters,--

Signed and Sealed this
Fourth Day of February, 2020

Andrei Iancu
*Director of the United States Patent and Trademark Office*